United States Patent
Hirayama

(10) Patent No.: US 8,266,651 B2
(45) Date of Patent: Sep. 11, 2012

(54) INFORMATION PROVIDING SYSTEM, INFORMATION TERMINAL DEVICE, INFORMATION SERVER DEVICE AND INFORMATION PROVIDING METHOD

(75) Inventor: Tomoshi Hirayama, Tokyo (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 11/320,683

(22) Filed: Dec. 30, 2005

(65) Prior Publication Data

US 2006/0107300 A1    May 18, 2006

Related U.S. Application Data

(63) Continuation of application No. 09/765,085, filed on Jan. 18, 2001, now Pat. No. 7,124,428.

(30) Foreign Application Priority Data

Jan. 31, 2000 (JP) ............... P2000-027408
Jan. 31, 2000 (JP) ............... P2000-027409
Jan. 31, 2000 (JP) ............... P2000-027411
Sep. 5, 2000 (JP) ............... P2000-269033

(51) Int. Cl.
*H04N 7/10* (2006.01)
*H04N 7/025* (2006.01)
*H04N 7/173* (2011.01)

(52) U.S. Cl. ............... 725/34; 725/32; 725/35; 725/110

(58) Field of Classification Search ............... 725/34, 725/35, 42, 46–49, 32, 105, 109, 110, 131, 725/134
See application file for complete search history.

(56) References Cited

U.S. PATENT DOCUMENTS

| | | |
|---|---|---|
| 5,600,364 A | 2/1997 | Hendricks et al. |
| 5,774,170 A | 6/1998 | Hite et al. |
| 5,815,671 A | 9/1998 | Morrison |
| 6,029,045 A | 2/2000 | Picco et al. |
| 6,425,127 B1 | 7/2002 | Bates et al. |
| 6,434,747 B1 | 8/2002 | Khoo et al. |
| 6,742,183 B1 | 5/2004 | Reynolds et al. |
| 6,944,879 B2 | 9/2005 | Hirayama |
| 7,036,738 B1 * | 5/2006 | Vanzini et al. ........ 235/486 |
| 7,055,166 B1 * | 5/2006 | Logan et al. ........ 725/32 |
| 2002/0078444 A1 * | 6/2002 | Krewin et al. ........ 725/35 |
| 2005/0182845 A1 | 8/2005 | Hirayama |

(Continued)

FOREIGN PATENT DOCUMENTS

EP    0 752 678 A2    1/1997

(Continued)

*Primary Examiner* — John Schnurr
(74) *Attorney, Agent, or Firm* — Oblon, Spivak, McClelland, Maier & Neustadt, L.L.P.

(57) ABSTRACT

An information providing system allows to intentionally modify the arrangement of clips to be reproduced from that of the first transmission. The program clips and the CM clips obtained by receiving those broadcast are stored in recorded result storage section 11 and rearrangement examining section 15 carries out a processing operation of comparing the attributes of each of the clips and the applicable profile data generated by applicable profile generating section 14. Then, the sequence of reproducing the contents clips is modified on the basis of the result of the processing operation and download operating section 16 downloads the contents clips to be added on an on-demand basis. Then, the final arrangement section 17 rearranges the sequence of reproducing the contents clips including those to be added to set up the final arrangement.

16 Claims, 16 Drawing Sheets

U.S. PATENT DOCUMENTS

2005/0198345 A1   9/2005   Hirayama

FOREIGN PATENT DOCUMENTS

| | | |
|---|---|---|
| JF | 11-112896 | 4/1999 |
| JP | 2-54646 | 2/1990 |
| JP | 8-502155 | 3/1996 |
| JP | 8-171374 | 7/1996 |
| JP | 9-116812 | 5/1997 |
| JP | 9-130346 | 5/1997 |
| JP | 9-163352 | 6/1997 |
| JP | 9-238321 | 9/1997 |
| JP | 10-26990 | 1/1998 |
| JP | 10-79711 | 3/1998 |
| JP | 10-79924 | 3/1998 |
| JP | 11-65434 | 3/1999 |
| JP | 11-69249 | 3/1999 |
| JP | 11-88279 | 3/1999 |
| JP | 11-96175 | 4/1999 |
| JP | 11-196389 | 7/1999 |
| JP | 11-205704 | 7/1999 |
| JP | 11-220704 | 8/1999 |
| JP | 11-328189 | 11/1999 |
| JP | 2000-13767 | 1/2000 |
| JP | 2000-50233 | 2/2000 |
| JP | 2000-152215 | 5/2000 |
| JP | 2001-507194 | 5/2001 |
| JP | 2002-511202 | 4/2002 |
| JP | 2002-518946 | 6/2002 |
| WO | WO 97/12486 | 4/1997 |
| WO | WO 97/17774 | 5/1997 |
| WO | WO 99/49661 | 9/1999 |

* cited by examiner

LIST OF SHIFTS

SM501 MOVE TO CUE 2

SM502 MOVE TO CUE 1

SM505 MOVE TO CUE 4

LIST OF OMISSIONS

SM503

SM504

LIST OF ADDITIONS

SM503R MOVE TO CUE 3

FIG.15

INFORMATION PROVIDING SYSTEM, INFORMATION TERMINAL DEVICE, INFORMATION SERVER DEVICE AND INFORMATION PROVIDING METHOD

CROSS REFERENCE TO RELATED APPLICATIONS

This application is a continuation of application Ser. No. 09/765,085 filed Jan. 18, 2001, and claims priority to the Japanese Patent No. P2000-027408, filed on Jan. 31, 2000, Japanese Patent No. P2000-027409 filed Jan. 31, 2000, Japanese Patent No. P2000-027411, filed Jan. 31, 2000, and Japanese Patent No. P2000-269033, filed Sep. 5, 2000, the entire contents of which being incorporated herein by reference.

BACKGROUND OF THE INVENTION

1. Field of the Invention

This invention relates to an information providing system adapted to provide contents data containing a group of multimedia contents obtained by combining prearranged program main body data and assisting materials as well as to an information terminal device, an information server device and an information providing method that are adapted to be used with such a system.

2. Description of the Related Art

The broadcasting stations of many broadcasting systems including those of terrestrial broadcasting, satellite broadcasting and CATV transmit news and programs with commercials (CMs) inserted therein. Differently stated, the sponsors of TV commercials bear the cost of producing programs and transmitting the produced programs, that should otherwise be borne by the viewers so that the viewers are provided with broadcasting services at considerably low cost.

Meanwhile, many programs that are broadcast are recorded on various recording means such as magnetic tapes by using recording/reproduction devices such as video cassette recorders (to be referred to as VCRs hereinafter) so that they may be replayed whenever necessary.

The recent technological developments in the fields of digital coding of audio signals and wide area telecommunications networks entails various possible applications of the technologies. Such possible applications include interactive video services that are being studied for feasibility. A typical example of such services is VoD (Video on Demand). With VoD, the video server of the transmitting station is connected to the set top box of each subscriber/receiver by way of telecommunications lines on a one to one basis so that the video server can be operated like a VCR according to the request of the subscriber sent from the set top box to the video server by way of an up line. For instance, the applicant of the present patent application has proposed an information providing system for the purpose of streaming transmission of programs on an on-demand basis where each subscriber/user can select and download a program by way of an information telecommunications network such as Internet (see Japanese Patent Application No. 11-354992).

For programs to be provided on an on-demand basis by streaming transmission, the transmission center of the service provider may typically store:

1) motion pictures to be transmitted in the Christmas season that contain CMs for Christmas sales inserted therein;

2) motion pictures to be transmitted in the New Year season that contain CMs for New Year sales inserted therein; and 3) motions pictures to be transmitted in night time zones in the Christmas season or the New Year season that contain CMs.

Then, the service provider may transmit any of the above programs to the subscriber/user on an on-demand basis in response to the request of the latter. Each on-demand program of the type under consideration will carry a price tag showing the price of the on-demand service that of course more than covers the cost of the service.

Most programs that are recorded and replayed by ordinary home users of recording/reproduction devices such as VCRs contain CMs that are unchangeable. In other words, the CMs inserted in a program or between any two programs cannot be changed and constantly stay there until the program or programs are erased.

However, CMs are a sort of commodity information and therefore mostly meaningful only for a certain limited period of time. Additionally, CMs need to be conveyed to selected targets.

For example, a CM for a discount sales campaign for a limited period of time will be meaningless if it is replayed after the period from the viewpoint of announcement and advertisement. Similarly, a CM for cosmetic products will have little effect if the viewers of the CM are mostly men. However, a broadcast program that is recorded by a recording/reproduction device will be reproduced without paying attention to the majority sex of the viewers.

Meanwhile, with known on-demand broadcasting systems, while a subscriber/user can select a program he or she wants to watch out of a plurality of available programs, the user cannot select one of same programs that are arranged differently.

As a result of the recent technological developments, particularly those related to Internet and other telecommunications networks, a wide variety of programs and other audio/video services are made available to viewers. Nowadays, viewers expect to obtain mass information not so much as information customized to individual viewers. However, preparing and storing customized pieces of information will require enormous efforts and a vast storage capacity because the demand of each viewer/user can change incessantly with time.

With know on-demand broadcasting systems, however, a given program accompanied by given CMs is always priced at a same level on a same cost management policy so that it will be a problem how to price the program if it is combined with different CMs immediately before transmission. If a program is combined with various different sets of CMs and recorded for storage in order to adapt itself to different situations, the transmission center will have to be provided with a vast storage capacity. Additionally, each of such combinations have to be priced appropriately, entailing cumbersome cost-related calculations.

BRIEF SUMMARY OF THE INVENTION

In view of the above identified circumstances, it is therefore an object of the present invention to make it possible to alter the arrangement of combining a program and CMs when it is replayed after the first transmission.

Another object of the present invention is to make it possible to provide highly reliable additional contents data to the user after the first transmission of a program.

Still another object of the present invention is to make it possible to change the user environment to one similar to that of some other user by replacing the profile data of the user with some other profile data.

A further object of the present invention is to make it possible to immediately settle the account whenever an auxiliary material is replaced so that any of the CM slots of a program may be resoled.

According to the invention, the above objects and other objects are achieved by providing an information providing system comprising:

a transmission server section for transmitting a continuous stream of contents data of a group of multimedia contents including prearranged combinations of program main body data and groups of auxiliary materials; and terminal sections for receiving the continuous stream of contents data transmitted from said transmission server section;

said terminal sections being provided with an arrangement control function of preparing a new arrangement by modifying the arrangement order of the contents data by processing the attribute data of each program main body data and that of each auxiliary material of a program as separated from each other as well as the profile data of the user and that of the user device.

In another aspect of the invention, there is provided an information terminal for receiving the continuous stream of contents data transmitted from said transmission server section, said terminal sections being provided with an arrangement control function of preparing a new arrangement by modifying the arrangement order of the contents data by processing the attribute data of each program main body data and that of each auxiliary material of a program as separated from each other as well as the profile data of the user and that of the user device.

In still another aspect of the invention, there is provided an information providing method comprising:

transmitting a continuous stream of contents data of a group of multimedia contents including prearranged combinations of program main body data and groups of auxiliary materials from a transmission server; and receiving the continuous stream of contents data by means of an information terminal and preparing a new arrangement by modifying the arrangement order of the contents data by processing the attribute data of each program main body data and that of each auxiliary material of a program as separated from each other as well as the profile data of the user and that of the user device.

In still another aspect of the invention, there is provided an information providing system comprising:

a transmission server section for transmitting a continuous stream of contents data of a group of multimedia contents including prearranged combinations of program main body data prepared with sorting information annexed thereto and groups of auxiliary materials;

terminal sections having a function of receiving the continuous stream of contents data transmitted from said transmission server section and transmitting the sorting information annexed to the program main body data and the auxiliary materials to be reproduced along with the terminal ID information; and a processing server section for sending the revision assisting materials, if any, corresponding to the auxiliary materials combined with the program main body data to be reproduced by appropriate ones of said terminal sections on the basis of the sorting information and the terminal ID information transmitted from the terminal sections.

In still another aspect of the invention, there is provided an information terminal having:

a function of receiving the continuous stream of contents data transmitted from said transmission server section;

a function of transmitting the sorting information annexed to the program main body data and the auxiliary materials to be reproduced along with the terminal ID information; and a function of receiving, if any, the revision assisting materials corresponding to the auxiliary material and transmitted on the basis of said sorting information and said terminal ID information.

In still another aspect of the invention, there is provided an information providing method comprising;

transmitting a continuous stream of contents data of a group of multimedia contents including prearranged combinations of program main body data prepared with sorting information annexed thereto and groups of auxiliary materials;

receiving the continuous stream of contents data and transmitting the sorting information annexed to the program main body data and the auxiliary materials to be reproduced along with the terminal ID information; and sending the revision assisting materials, if any, corresponding to the auxiliary materials on the basis of the sorting information and the terminal ID information.

In still another aspect of the invention, there is provided an information providing system comprising:

a transmission server section for transmitting a continuous stream of contents data of a group of multimedia contents including prearranged combinations of program main body data prepared with sorting information annexed thereto and groups of auxiliary materials;

terminal sections having a function of receiving the continuous stream of contents data transmitted from said transmission server section, a function of recording the program main body data and the auxiliary materials received by it, a function of recording the sorting information annexed to said program main body data and said auxiliary materials and a function of transmitting the sorting information annexed to the program main body data and the auxiliary materials selected by it along with the terminal ID information; and a processing server section for detecting any change to be made to the auxiliary materials combined with the selected program main body data and, upon detecting such a change, issuing an instruction for the change made to be made to said auxiliary materials to the related terminal section.

In still another aspect of the invention, there is provided an information terminal device having:

a function of receiving the continuous stream of contents data;

a function of recording the program main body data and the auxiliary materials received by it, a function of recording the sorting information annexed to said program main body data and said auxiliary materials; and a function of transmitting the sorting information annexed to the program main body data and the auxiliary materials selected by it along with the terminal ID information;

In still another aspect of the invention, there is provided an information server device having:

a function of receiving sorting information and terminal ID information from an information terminal having a function of transmitting said sorting information as annexed to selected program main body data and auxiliary materials along with said terminal ID information;

a function of detecting any change to be made to the auxiliary materials combined with the program main body data selected by said terminal section on the basis of the sorting information and the terminal ID information received by it; and a function of issuing an instruction for the change to be made to the auxiliary materials upon detecting the change to be made.

In a further aspect of the invention, there is provided an information providing method comprising:

transmitting a continuous stream of contents data of a group of multimedia contents including prearranged combinations of program main body data prepared with sorting information annexed thereto and groups of auxiliary materials; and detecting any change to be made to the auxiliary materials combined with the selected program main body data and, upon detecting such a change, issuing an instruction for the change made to be made to said auxiliary materials to an information terminal;

said information terminal having a function of receiving the continuous stream of contents data transmitted from said transmission server section, recording the program main body data and the auxiliary materials received by it, recording the sorting information annexed to said program main body data and said auxiliary materials and transmitting the sorting information annexed to the selected program main body data and auxiliary materials along with the terminal ID information.

Thus, according to the invention, since it is possible to prepare a new arrangement by modifying the arrangement order of the contents data by processing the attribute data of each program main body data and that of each auxiliary material of a program as separated from each other as well as the profile data of the user and that of the user device, the arrangement of clips to be reproduced can be modified from that of the first transmission so as to make them more appealing to the viewer at the time of reproduction.

Additionally, according to the invention, since it is possible for an information terminal section to request additional contents data on an on-demand basis and taking in the additional contents data on the basis of the result obtained by processing the attribute data and the profile data, it is possible to provide highly reliable additional contents data to the user after the first transmission of a program. Additionally, the user feels the reproduced clips just as if they were being transmitted like an ordinary broadcast program.

Additionally, according to the invention, since an information terminal has a memory means adapted to temporarily replace the profile data with some other profile data, it is possible to change the user environment to one similar to that of some other user by replacing the profile data of the user with some other profile data.

Additionally, according to the invention, since the transmission server of an information providing system has a management function of settling the accounts on the basis of the result of reproducing the contents data according to the new arrangement as notified from the terminal section, it is possible to automatically add up the charges for the resold contents clips and settle the accounts with the advertising agents and the sponsors including those of the original CMs. Therefore, after the expiration of the effective period of each of the original CMs, the sponsor of the CM can resell the time slot of the CM to a third party to minimize the loss. Additionally, the information providing system can adapt itself to any replaced user device as it manages the profile data thereof by means of its management function. Still additionally, because the information providing system 50 manages the entire profile data of its users/subscribers, it can simulate the effect of a program before transmission so that it can automatically determine the resale price of each CM time slot.

Still additionally, according to the invention, it is possible to arrange for transmitting a continuous stream of contents data of a group of multimedia contents including prearranged combinations of program main body data prepared with sorting information annexed thereto and groups of auxiliary materials, receiving the continuous stream of contents data and transmitting the sorting information annexed to the program main body data and the auxiliary materials to be reproduced along with the terminal ID information and sending the revision assisting materials, if any, corresponding to the auxiliary materials on the basis of the sorting information and the terminal ID information. In other words, the server can prepare instructions for revisions and additions/omissions to the auxiliary materials to be issued to the information terminal on the basis of the sorting information and the terminal ID information received from the latter and sends any missing auxiliary materials on a timely basis. Therefore, the arrangement of clips to be reproduced can be modified from that of the first transmission and it is possible to provide highly reliable additional contents data to the user after the first transmission of a program.

Finally, according to the invention, it is also possible to arrange for transmitting a continuous stream of contents data of a group of multimedia contents including prearranged combinations of program main body data prepared with sorting information annexed thereto and groups of auxiliary materials and detecting any change to be made to the auxiliary materials combined with the selected program main body data and, upon detecting such a change, issuing an instruction for the change to be made to the auxiliary materials to an information terminal, the information terminal having a function of receiving the continuous stream of contents data transmitted from the transmission server section, recording the program main body data and the auxiliary materials received by it, recording the sorting information annexed to the program main body data and the auxiliary materials and transmitting the sorting information annexed to the selected program main body data and auxiliary materials along with the terminal ID information. Therefore, the arrangement of clips to be reproduced can be modified from that of the first transmission and it is possible to provide highly reliable additional contents data to the user after the first transmission of a program. Additionally, the account can be settled for the replaced auxiliary materials and CM time slots can resold.

BRIEF DESCRIPTION OF THE SEVERAL VIEWS OF THE DRAWING

FIG. 15 is a schematic illustration of an instruction for "revisions/additions/omissions" to be transmitted from the processing server to the recording/reproduction device.

DETAILED DESCRIPTION OF THE INVENTION

Now, the present invention will be described by referring to the accompanying drawings that illustrate preferred embodiments of the invention.

Figure 1:
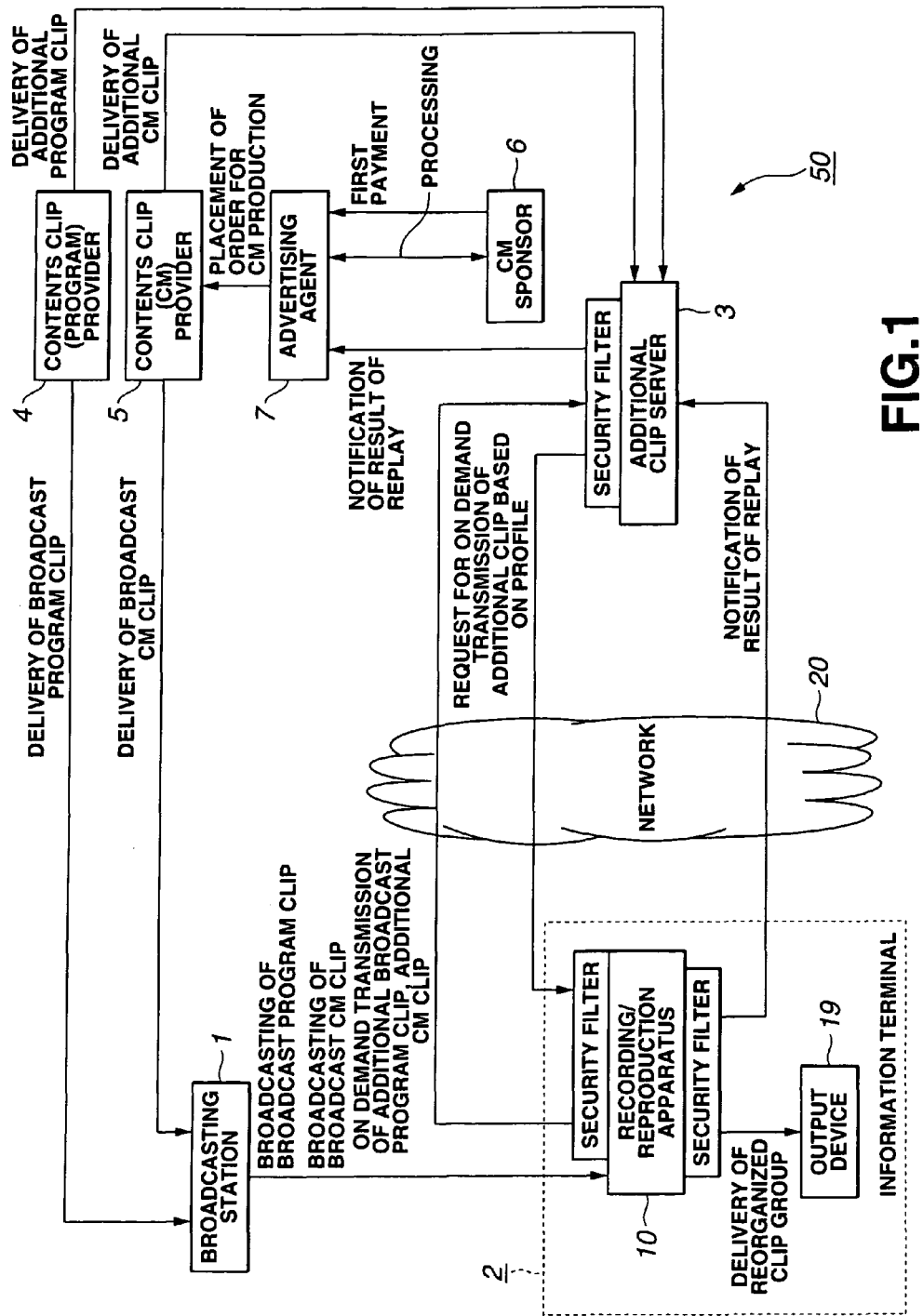
FIG. 1 is a schematic block diagram of an embodiment of information providing system according to the invention.

FIG. 1 is a schematic block diagram of information providing system 50 according to the invention. The information providing system 50 comprises a broadcasting station 1 for transmitting a continuous stream of contents data on combinations of program clips and CM clips prepared for broadcasting, information terminals 2, each being adapted to receive the continuous stream of contents data, and an additional clip server 3 connected to said information terminals 2 by way of a network that may be Internet.

In the information providing system 50, program main body data prepared in advance for programs are delivered from contents clip (program) providers 4 to the broadcasting station 1. Additionally, auxiliary material data groups prepared by contents clip (CM) providers 5 for orders placed by advertising agents 7 acting for respective CM sponsors 6 are also delivered to the broadcasting station 1.

The attributes of each of the program main body data of the program clips and the auxiliary material data of the CM clips is defined. In other words, each of the program main body data and the auxiliary material data is accompanied by its attribute data.

Then, the broadcasting station 1 transmits a continuous stream of contents data on combinations of program clips containing program main body data and CM clips containing auxiliary material data that are prepared as multimedia contents group in advance for broadcasting.

Figure 2:
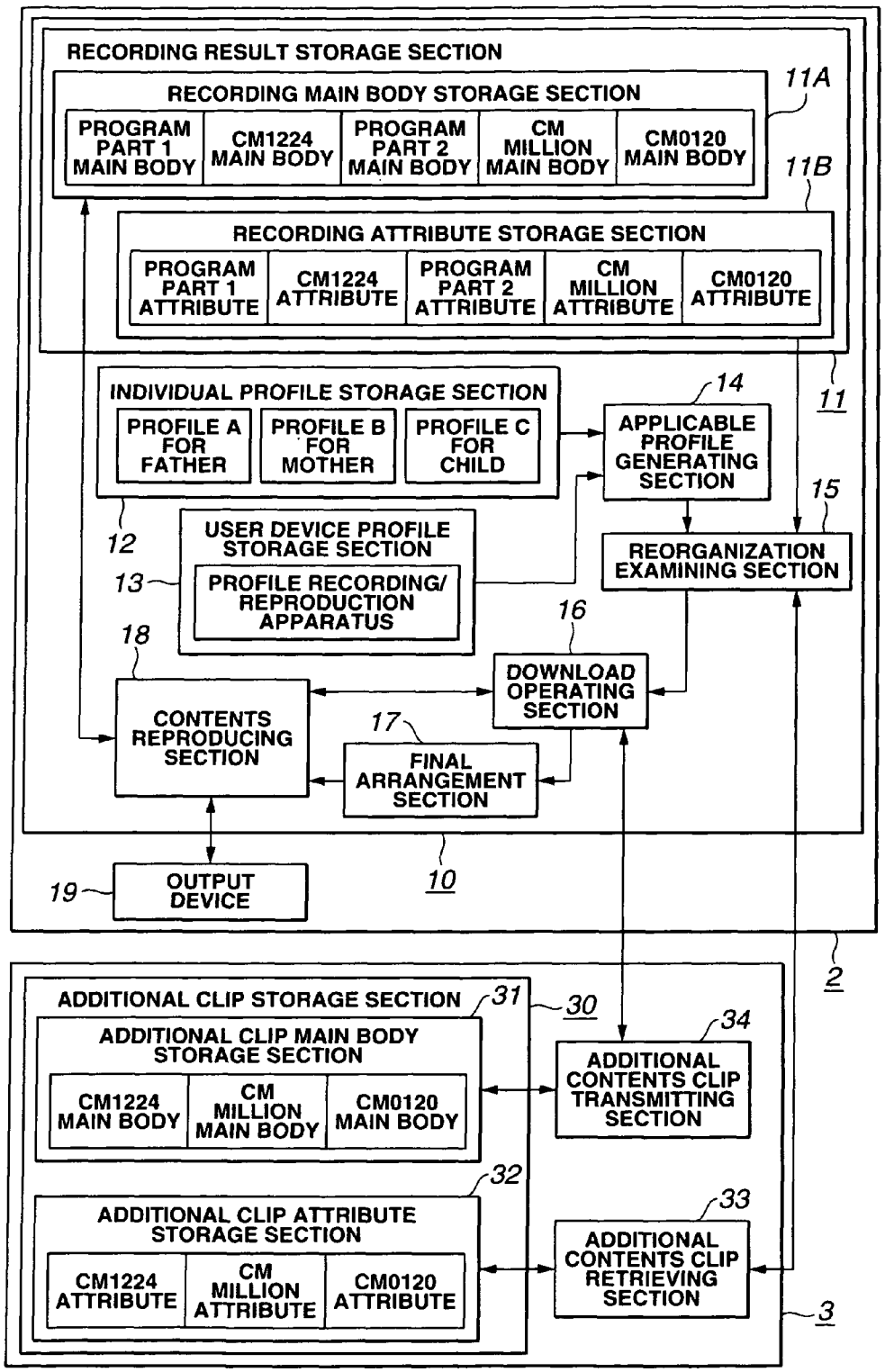
FIG. 2 is a schematic block diagram of a principal portion of the recording/reproduction device of one of the information terminals of the embodiment of information providing system of FIG. 1.

On the other hand, each of the information terminals 2 for receiving the continuous stream of contents data transmitted from the broadcasting station 1 comprises a recording/reproduction device 10 adapted to receive the continuous stream of contents data transmitted from the broadcasting station 1 and store them in a recording medium such as a semiconductor memory or a hard disk that is randomly accessible and adapted to reproduce any of the stored data as shown in FIG. 2.

More specifically, the recording/reproduction device 10 by turn comprises a recording result storage section 11, an individual profile storage section 12, a user device profile storage section 13, an applicable profile generating section 14, a rearrangement examining section 15, a download operating section 16, a final arrangement section 17 and a contents reproducing section 18. The recording/reproduction device 10 is connected to an output device 19.

The recording result storage section 11 includes a recorded main body storage section 11A and a recorded attribute storage section 11B. Thus, the program clips and the CM clips for broadcasting obtained by receiving the continuous stream of contents data transmitted from the broadcasting station 1 are stored in said recorded main body storage section 11A and the attribute data of the program clips and the CM clips for broadcasting stored in said recorded main body storage section 11A are stored in the recorded attribute storage section 11B.

The individual profile storage section 12 stores the profile data of the user including the name, the age, the sex, the profession and the hobbies of the user.

The user device profile storage section 13 stores the profile data of the recording/reproduction device 10 including the address of the building where the device 10 is installed and the specific place in the building where the device 10 is placed and the date when the device 10 is installed.

The applicable profile generating section 14 is adapted to generate an applicable profile by processing the profile data of the user stored in the individual profile storage section 12 and the profile data of the user device stored in the user device profile storage section 13.

For each program clip, the rearrangement examining section (control section) 15 compares the attributes of the contents clips including those of the program clips and those of the CM clips accompanying the program clips to be used for broadcasting with the applicable profile data generated by the applicable profile data generating section 14 and, if necessary, it modifies the sequence of replaying the contents clips on the basis of the result of the comparing operation. Then, if it detects that one or more than one contents clips are missing, it determines the contents clips to be added and notifies the additional clip server of the missing clips by way of the network 20, which may be Internet. Subsequently, the download operating section 16 downloads the contents clips to be added from the additional clip server 3 on an on-demand basis.

The final arrangement section 17 rearranges the sequence of replaying the contents clips including the additional contents clips downloaded by the download operating section 16 to draw a final arrangement plan.

Then, the contents reproducing section 18 reads out the program clips and the CM clips from the recording result storage section 11 and the additional contents clips from the download operating section 16 and reproduces the audio/video data or the program contained in the contents data according to the final arrangement plan drawn by the final arrangement section 17. Then, it outputs the reproduced program to the output device 19 that typically comprises a loudspeaker, a monitor and a data processing device.

Thus, the recording/reproduction device 10 is controlled on the basis of the relationship between the attributes and the profiles of contents clips and operates to acknowledge or refuse to acknowledge a given set of additional clips to be introduced on an on-demand basis. If it acknowledges the introduction of a given set of additional clips, it can take in each of the customized replacement contents clips as specified on the basis of the relationship between the attributes and the profile of the contents clip and its attributes from the additional clip server 3 by way of the network 20 that may be Internet. Additionally, the recording/reproduction device 10 is adapted to have a script describing the controlling macro-relationship relative to the group of attributes of the contents clips so that, for instance, it can automatically make an arrangement for omitting clip C if clip A is replaced by clip B.

Said additional clip server 3 receives the additional program main body data from the contents clip (program) provider 4 as additional program clip and also a group of additional auxiliary materials from the contents clip (CM) provider 5. The attributes of the program main body data of the program clips and those of the auxiliary material data of the CM clips are defined and attached respectively to the program main body data and the auxiliary material data as their respective attribute data.

The additional clip server 3 comprises an additional clip storage section 30 including an additional clip main body storage section 31 and an additional clip attribute storage section 32, of which the additional clip storage section 30 stores the additional program clips and the additional CM clips delivered respectively from the contents clip (program) provider 4 and the contents clip (CM) provider 5 while the additional clip attribute storage section 32 stores the attribute data of the additional program clips and the additional CM clips stored in said additional clip main body storage section 31. Upon receiving the notification on the types of the contents clips to be added from the recording/reproduction device 10 of the information terminal 2 by way of the network 20 that may be internet, the additional clip server 3 controls the additional contents clip retrieving section 30 to detect the additional contents clips stored in the additional clip main body storage section 31 and transmits the detected additional contents clips from additional contents slip transmitting section 33 to the information terminal 2 by way of the network 20 that may be Internet.

The additional clip server 3 of the information providing system 50 has a management function and is adapted to receive the final result of reproduction according to the above described final arrangement plan from said information terminal byway of the network 20 so that it summarizes the result it receives and automatically recognizes the replacements by resorting to its management function. Then, it notifies the related advertising agents 7 of the replacements and settles the accounts with the respective CM sponsors 6.

It may alternatively be so arranged that the additional clip server 3 manages the profiles of the user devices and carries out all processing operations relating attributes and profiles so that each of the user devices, or the information terminals 2, is only required to notify the additional clip server 3 with it ID number assigned to it and receive the finalized replay sequence. Then, if the ID number and/or the profile data are stored in a movable and removable recording medium such as a card-shaped memory device, the ID number and/or the profile data stored in the removable recording medium may be used in some other information terminal 2. If the profile of some other user is already defined in said some other information terminal 2 that is to be used with the removable recording medium storing the ID number and/or the profile data, the original profile and the information on the on-demand contents and the replay sequence introduced by using the original profile are made to temporarily escape to some other storage area of said some other information terminal 2 to be used with the removable recording medium storing the ID number and/or the profile data and an operation of defining the replay sequence is carried out on the basis of the profile brought in by said recording medium. When the recording medium is removed, said some other information terminal 2 restores the original state and the original profile.

With the information providing system 50 having the above described configuration, some or all of the CMs of a program can be replaced in a manner as described below.

Assume that a CM announcing a discount sale that takes place during the period between November 1st and December 24th is referred to as "CM 1224" and a CM announcing a discount sale that takes place during the period between December 25th and January 20th is referred to as "CM 0120". Also assume that a special CM for viewers with an annual income of hundred thousands or more and an age equal to or more than 30 is referred to as "CM 100 thousands" and a CM for viewers with an annual income less than hundred thousands is referred to as "CM 000 thousands". Assume that the first substance of a program is referred to as program Part 1 and the next substance of the program is referred to as program Part 2.

Finally, assume that the program is broadcast for the first time on December 20th in the order of program Part 1, CM 1224 main body, program Part 2, CM 000 thousands main body and CM 0120.

"CM 1224" is provided with attributes (effective period: Nov. 1st through Dec. 24th, replacement to be promoted) and the attribute data are transmitted with the CM clip of "CM 1224".

"CM 0120" is provided with attributes (effective period: Dec. 25th through January 20th, replacement to be promoted) and the attribute data are transmitted with the CM clip of "CM 0120".

"CM 000 thousands" is provided with attributes (targets: viewers with an annual income less than hundred thousands, no specified age slot, replacement to be promoted, on-demand swap to be promoted) and the attribute data are transmitted with the CM clip of "CM 000 thousands".

"program Part 1" and "program Part 2" are also provided with attributes (nil) and the attribute data are transmitted with the program clips of "program Part 1" and "program Part 2"

The information terminal 2 receives the original transmitted on December 20th and stores the program clips and the CM clips including the program Part 1 main body, the CM 1224 main body, the program Part 2 main body, the CM 100 thousands main body and the CM 0120 main body in the recorded main body storage section 11A of the recording/reproduction device 10 and also stores the attribute data of the program clips and CM clips including the attributes of program Part 1, those of CM 1224, those of program Part 2, those of CM 100 thousands and those of CM 0120 in the recorded attribute storage section 11B of the recording/reproduction device 10.

Assume that the individual profile storage section 12 of the recording/reproduction device 10 stores as profile A the following pieces of information.

default area: Manhattan
user name: AAA
age: 42 sex: male
profession: engineer
annual income: 110 thousand dollars
hobby: music, movie
age information: can be passed
online reception: OK Note that the individual profile storage section 12 can store a plurality of profiles.

Assume also that the user device profile storage section 13 of the recording/reproduction device 10 stores as profile 1 the following pieces of information.

time: to be sequentially detected from timer
installed place: living room
address of installation: Madison Ave., . . . , New York, N.Y. State Assume now that the view AAA replayed on December 26th the clips transmitted for the first time on December 20th and recorded by the recording/reproduction device 10 of the information terminal 2.

As the recording/reproduction device 10 of the information terminal 2 is operated for replaying, the applicable profile generating section 14 generates an applicable profile data typically by carrying out an arithmetic operation for determining the sum of the sets of profile data of the profile A stored in the individual profile storage section 12 and the sets of profile data of the profile 1 stored in the user device profile storage section 13 and the rearrangement examining section 15 compares the attributes of the contents clips recorded in the recorded result storage section 11 including the program clips and the CM clips used for broadcasting with the applicable profile data generated by the applicable profile generating section 14. Then, if necessary, it alters the sequence of reproduction of the contents clips according to the result of the comparison and recognizes the contents clips that are missing and hence to be added. Thereafter, the download operating section 16 downloads the contents clips to be added on an on-demand basis from the additional clip server 3 by way of the network 20 that may be Internet.

In the above example, "CM1224" that is the recorded second clip is determined to be out of the effective period as a result of the comparison of its attributes and the corresponding applicable profile data and, since the attributes include that of "replacement to be promoted", it is replaced by "CM 0120" that remains effective on 26th so that "CM 0120" is brought closer to the top.

Additionally, in the above example, since the applicable profile shows that the annual income exceeds 100 thousand dollars and can be told and online reception is OK, while the attributes of "CM 000 thousands" include "replacement to be promoted" and "on-demand swap to be promoted", the information terminal 2 accesses the additional clip server 3 by way of the network 20 to retrieve and download the right clip, which is "CM 1400 thousands", as replacement for "CM 000 thousands" while it is reproducing program Part 1.

Then, the contents reproducing section 18 reads out the right program clips and the right CM clips and the additional contents clip from the recorded result storage section 11 and the download operating section 16 according to the final arrangement plan telling the replay sequence of the clips and prepared by the final arrangement section 17 by taking the additional contents clip downloaded by the download operating section 16 into consideration.

Then, the contents reproducing section 18 reproduces the above clips sequentially in the order of program Part 1, CM 0120, program Part 2 and on-demand CM 100 thousands.

When reproducing the contents clips including one or more than one replacements, the contents reproducing section 18 can output the information on the replacements to the output device 19. It is also possible to know the profile information according to which the replacement is selected.

Of the information providing system 50, the information terminal 2 sends the result of the reproduction of the contents clips according to the final arrangement plan to the additional clip server 3 having the management function by way of the network 20.

Then, the additional clip server 3 adds up the results it receives by means of its management function and automatically recognizes the replacements. Thereafter, it notifies the related advertising agents 7 of the results and settles the accounts with the advertising agents 7 and the sponsors 6 for the reproduction including the replacements.

Of the information providing system 50, the additional clip server 3 having the management function manages the summary of the alterations made to the sequence of reproducing contents clips by the information terminal 2 so that it can automatically add up the charges for the resold contents clips and settle the accounts with the advertising agents 7 and the sponsors 6 including those of the original CMs. Therefore, after the expiration of the effective period of each of the original CMs, the sponsor 6 of the CM can resell the time slot of the CM to a third party to minimize the loss. Additionally, the information providing system 50 can adapt itself to any replaced user device as it manages the profile data thereof by means of its management function. Still additionally, because the information providing system 50 manages the entire profile data of its users/subscribers, it can simulate the effect of a program before transmission so that it can automatically determine the resale price of each CM time slot.

Of the information providing system 50 having the above described configuration, the information terminal 2 can rearrange the sequence of replaying the contents clips by processing the program main body data, the attribute data belonging to the auxiliary materials, the profile data of the user and those of the user device so that the sequence of replaying the clips of the recorded broadcast can be altered from that of transmitting the broadcast in order to more satisfy the user/subscriber. In other words, any of the clips to be replayed for the user/subscriber can be replaced instantaneously to make the arrangement more satisfactory to the user/subscriber. Additionally, since it is possible for the information terminal 2 to request additional contents data to the additional clip server 3 on the basis of the result of the above operation of processing the attribute data and the profile data and taken in the intended additional contents data, information customized to the user/subscriber in terms of replay time and life style can be made available to him or her. In other words, the user/subscriber and can watch the replay just as if he were watching the original and is provided with information that is more useful and reliable than the one provided by the original transmission.

Thus, with the above described information providing system 50, it is possible to replace any obsolete CMs, reflecting the timer calendar to the applicable profile. Additionally, it is possible to replace a nation wide CM edition with a corresponding local CM edition, reflecting the local information of the local area where the user/subscriber lives to the applicable profile. Still additionally, it is possible to replace the CMs in such a way that CMs for high priced commodities may be provided to the user/subscriber, reflecting the income information to the applicable profile. Beside, it is possible to provide a cherry blossom watching travel program that is produced by timely replacing the destination area on the basis of the forecast for the cherry blossom front, reflecting the timer calendar to the applicable profile. For example, the destination of the scheduled cherry blossom watching travel shown in a cherry blossom watching travel program may be Kyusyu in March but may be replaced by Tohoku in April, although the telephone number of the receptionist of the travel agent and the starting point of the travels may be same and commonly used both in the original program and in the replacement. Additionally, some of the CMs may be replaced by those of local travel guide, reflecting the destination of the schedule cherry blossom watching travel to the applicable profile. If some of the hobbies of the user/subscriber that are input and recorded are related to the destination of the scheduled travel, the attributes of the CMs may be made to match the hobbies. As another example, in a program for teaching the procedure of submitting the tax return of the year, the contents may be partly replaced and rearranged appropriately to reflect the sources and the amount of income of the user/subscriber to the applicable profile so that the user/subscriber may be able to watch a program that matches the amount and the profile of annual income that may vary depending on if he or she earns money from real estate or not, if he or she received a retirement grant or not and so on. As still another example, in a program for instructing the shop regulations of a company, the parts that vary depending on the position in the company may be replaced for each viewer/employee, while the parts that are common to all the employees may remain unchanged. Then, the ordinary employees and the employees of the management level maybe made to watch different respective programs. As still another example, in a stock market program, the contents clips may be so arranged that every user/inventor may watch the information on the stocks he or she has (auxiliary materials) first, reflecting the stocks to the applicable profile. As still another example, in a sports information program, the information on the favorite team may be reflected to the applicable profile so that the information on the team (auxiliary materials) may take a major part in the program. As still another example, the date of birth of a child may be stored and reflected to the applicable profile so that an education program may be made to contain teaching materials adapted to children of the age. As still another example, the favorite programs of a child may be automatically analyzed and the result of the analysis may be reflected to a BGM program so that the program may contain tunes of the favorite genre of the child to a large extent. As a further example, the favorite air lines of a person may be automatically analyses and the result of the analysis may be reflected to a travel information program that shows candidate timetables for an itinerary where the flight services of the air lines has the top priority and shown first. Furthermore, in the information providing system 50, it may be so arranged the data to be put into the applicable profile are automatically updated or automatically analysed to make the profile a highly dynamic one.

The information terminal 2 is also adapted to adopt the environment of some other person as that of the user/subscriber him- or herself by using a removable recording medium storing the profile data of that some other person. The original environment can be restored by removing the removable recording medium storing the profile data of that some other person.

Of the above described information providing system 50, the sequence of producing contents data is rearranged by processing the program main body data of each of the program clips and the attribute data belonging to each of the auxiliary materials to be transmitted, the profile data of the user/subscriber and those of the user device at the information terminal 2. However, the configuration of the information providing system 50 can be modified to the one as illustrated in FIG. 3 and denoted by reference symbol 100 so that the arrangement of the contents data of the first transmission can be intentionally modified when they are reproduced.

Figure 3:
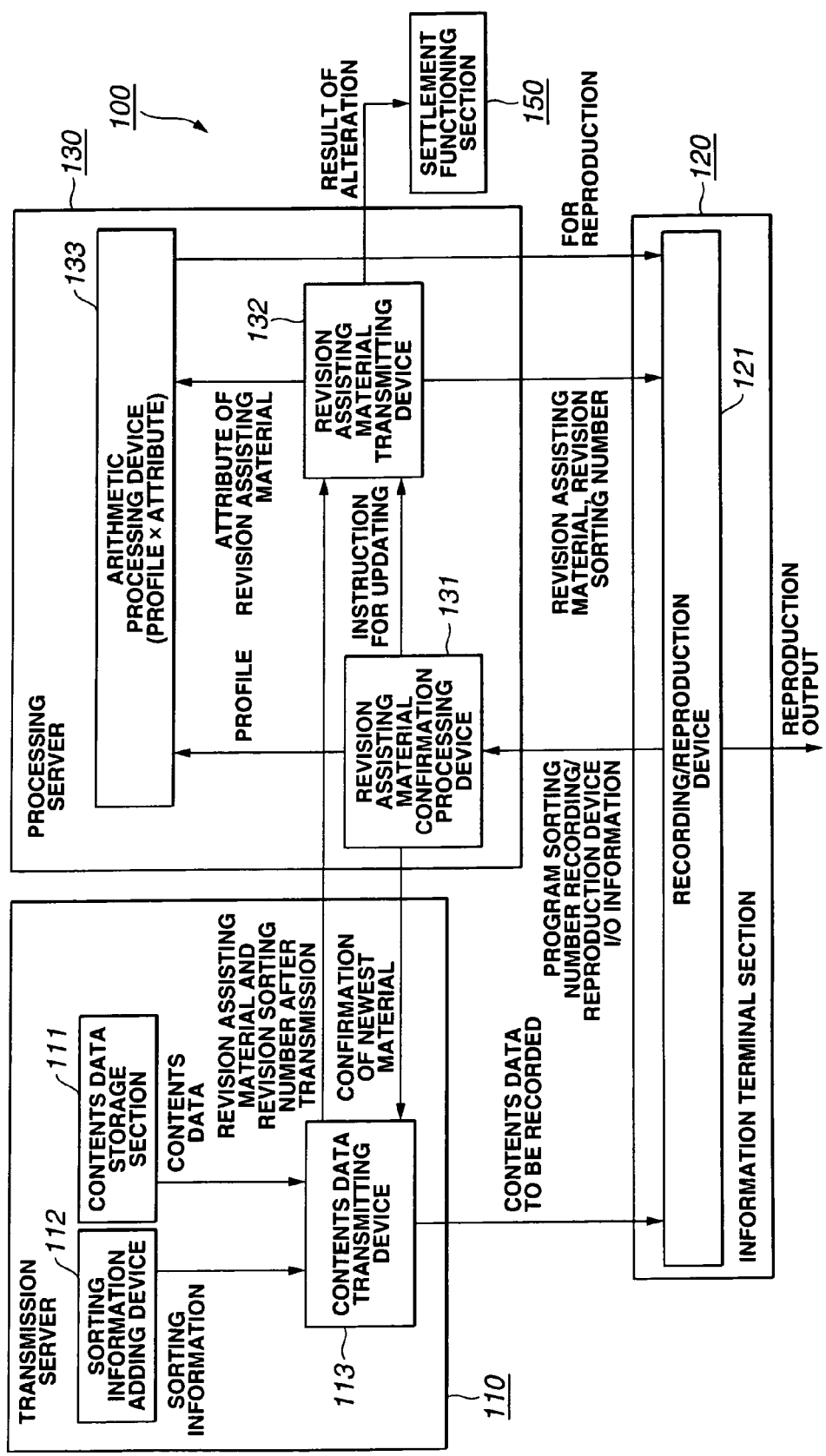
FIG. 3 is a schematic block diagram of another embodiment of information providing system according to the invention.

The information providing system 100 of FIG. 3 comprises a transmission server 110 for transmitting a continuous stream of contents data on combinations of program main body data and auxiliary material groups that are provided in advance with sorting information as a multimedia contents group, information terminals 120 for receiving the continuous stream of contents data from the transmission server 110 and a processing server 130 to which the information terminals 120 are connected by way of a network that may be Internet as well as other components.

Of the information providing system 100, the transmission server 110 by turn comprises contents data storage device 111 for storing contents data that are combinations of program main body data and auxiliary material groups (program main bodies+auxiliary materials), a sorting information adding device 112 for generating sorting information to be added to the contents data read out from the contents data storage section and a contents data transmitting device 113 for transmitting the contents data (program main bodies+auxiliary materials) read out from the contents data storage device 111, to which the sorting information produced by the sorting information adding device 112 is added, to the target information terminal(s) 120.

In the transmission server 110, a program sorting number is added to each of the contents data read out from the contents data storage device 111 before it is input to the contents data transmitting section 113.

Figure 4:
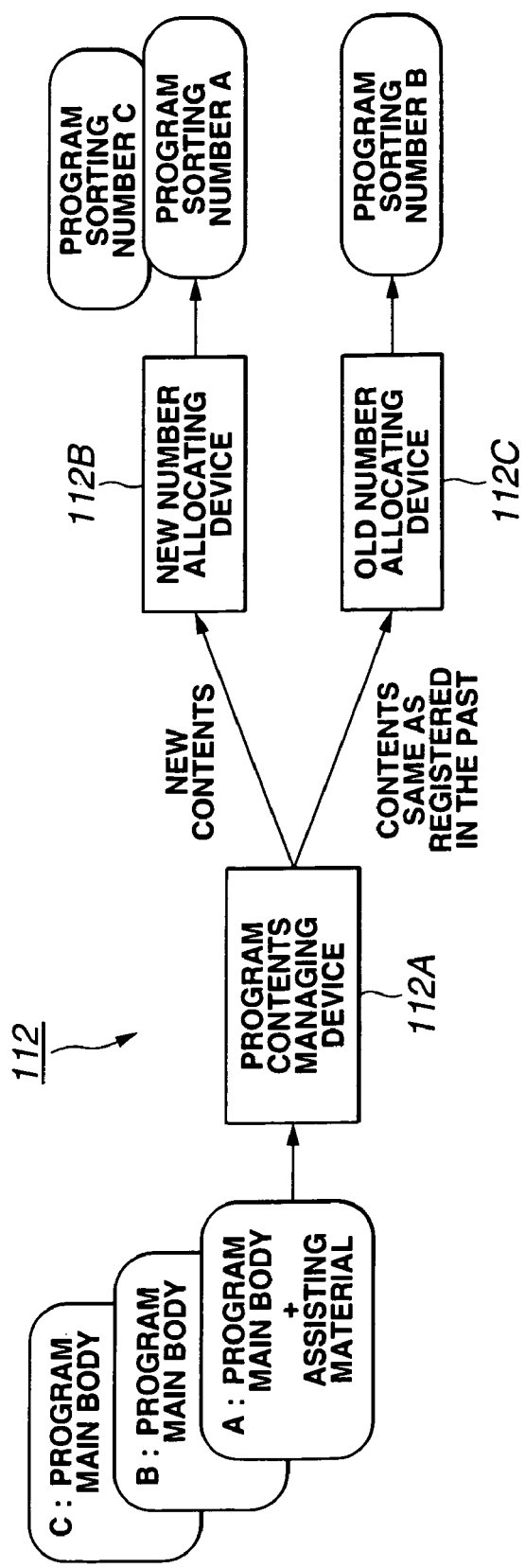
FIG. 4 is a schematic illustration of allocating program sorting numbers to contents data by a sorting information applying device of the transmission server of the embodiment of information providing system of FIG. 3.

More specifically, if the contents data read out from the contents data storage device 11 1 include contents data A, B and C, each containing a program main body and a set of auxiliary materials as shown in FIG. 4, program contents managing device 112A of the sorting information adding device 112 determines if each of the contents data A, B, C is same as the one carrying the same number and registered in the past or not. Assume here that the contents data A, C are determined to contain something new therein. Then, in the sorting information adding device 112, new number allocating device 112B generates new program sorting numbers A, C and allocates them respectively to the contents data A, C, while old number allocating device 112C allocates the old number to the contents data B that is determined to be same as the one carrying the same number and registered in the past.

Then, in the sorting information adding device 112, each of the program sorting number allocated in a manner as described above is combined with the address assigned to the processing server 130 by the return address transmitting device 112D to produce the sorting information of related contents data.

Figure 5:
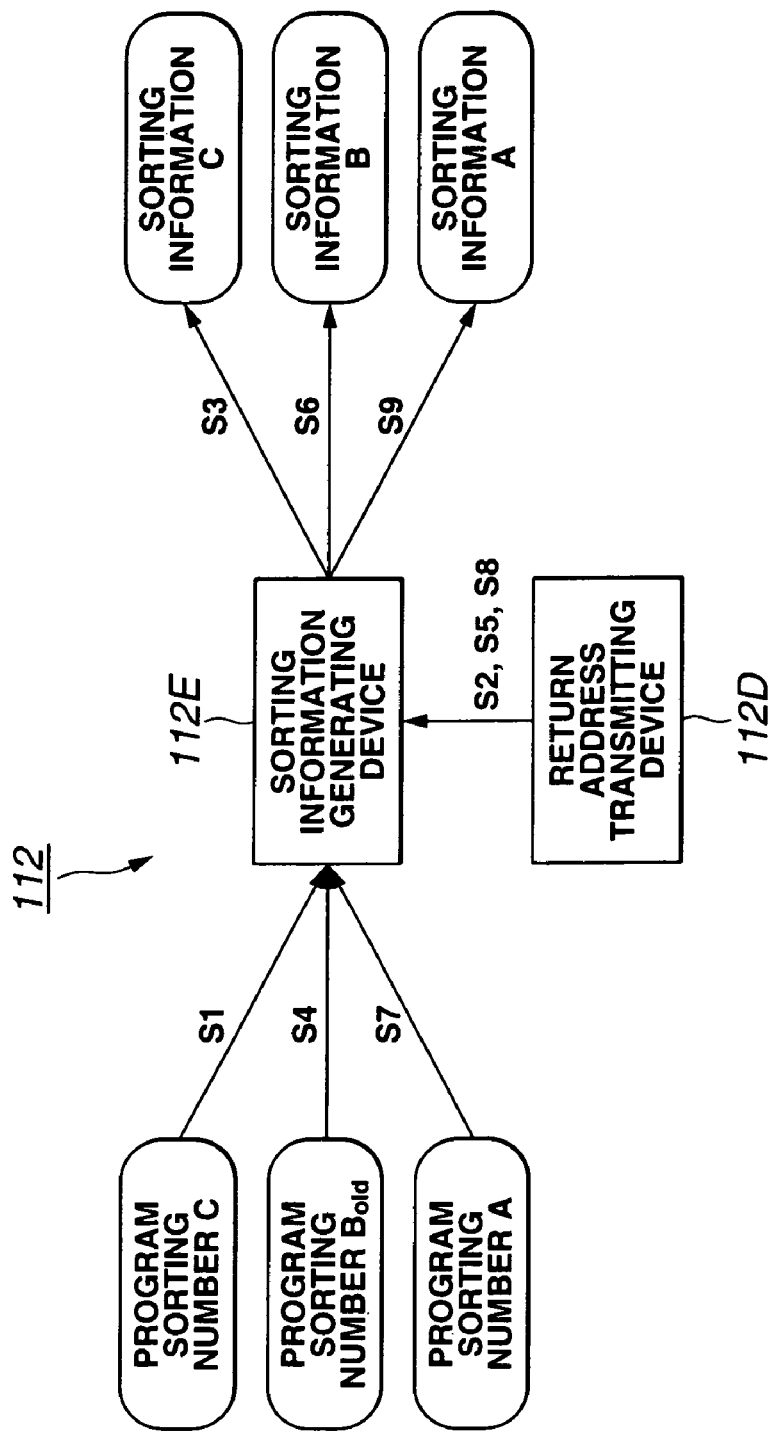
FIG. 5 is a schematic illustration of the process of applying sorting information by the sorting information applying device of FIG. 4.
Figure 6:
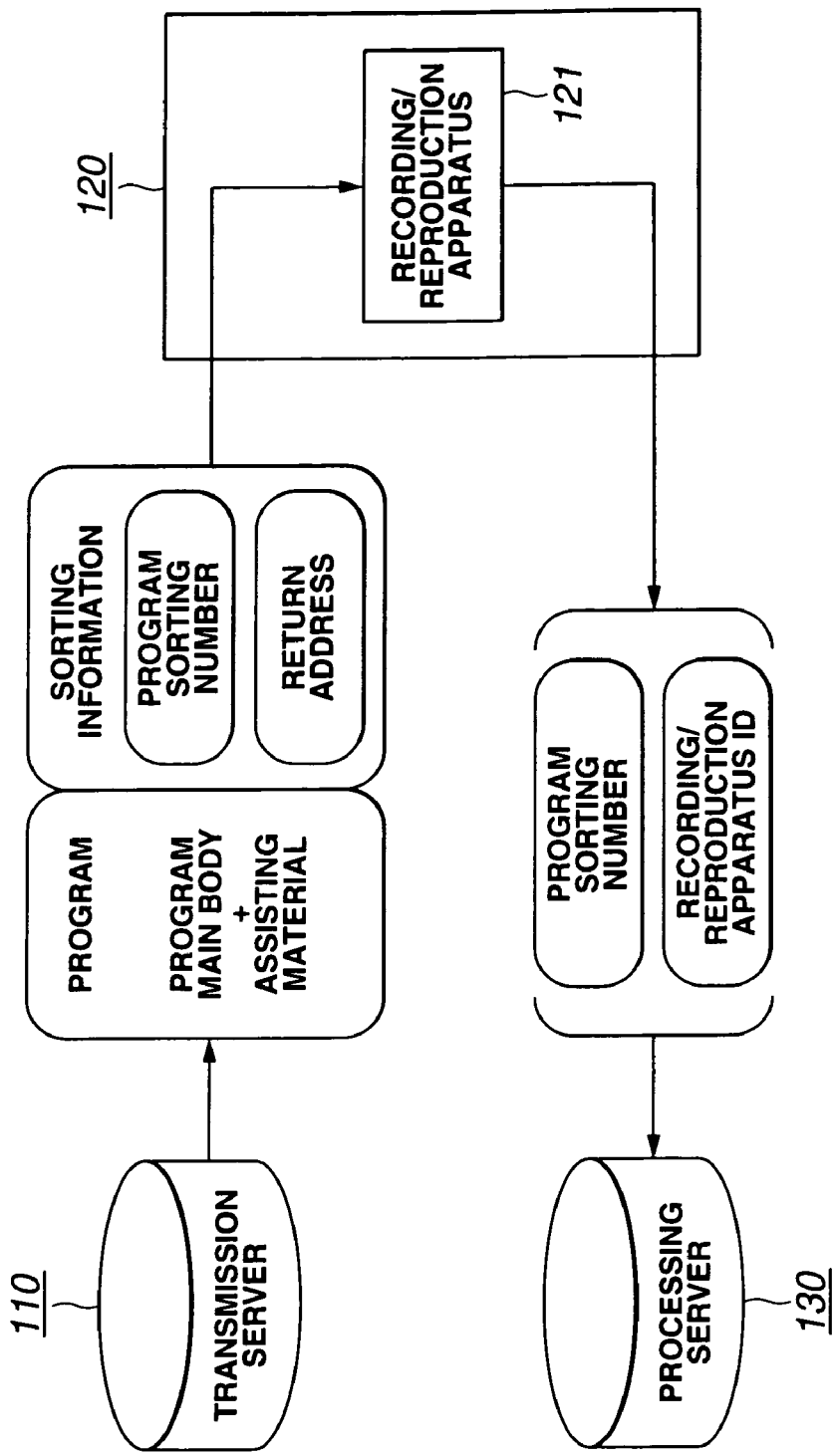
FIG. 6 is a schematic illustration of transmission of contents data and sorting information in the embodiment of information providing system of FIG. 3.

FIG. 5 is a flow chart of the operation of generating sorting information such as the sorting information A of the contents data A, the sorting information B of the contents data B, the sorting information C of the contents data A and so on. As shown by Steps S1 through 9 in FIG. 5, the sorting information of each contents data is generated immediately before the contents data is sent out from sorting information generating device 112E of the sorting number adding device 112. The generated sorting information is then combined with the contents data (program main bodies+auxiliary materials) as shown in FIG. 4 and transmitted to the related user information terminal(s) 120 from the transmission server 110 as shown in FIG. 6. Note that the transmission server 110 may transmits the contents data (program main bodies+auxiliary materials) in the form of many identical signals as in the case of multi-casting or broadcasting or as an individual signal (contents) that is sent to an information terminal on an on-demand basis.

Of the information providing system 100, the information terminal 120 comprises a recording/reproduction device 121 for receiving the continuous stream of contents data from the transmission server 110 and recording them on a recording medium that can be randomly accessed to retrieve any part of the recorded contents data. The recording/reproduction device 121 is adapted to store each of the contents data (program main bodies+auxiliary materials) in the continuous stream transmitted from the transmission server 100 as combined with the program sorting number allocated to it and transmit the program sorting number of the contents data (program main body+auxiliary materials) with the reproduction device ID information of the recording/reproduction device 121 to the processing server 130 by way of the network that may be Internet when the contents data is reproduced.

Figure 7:
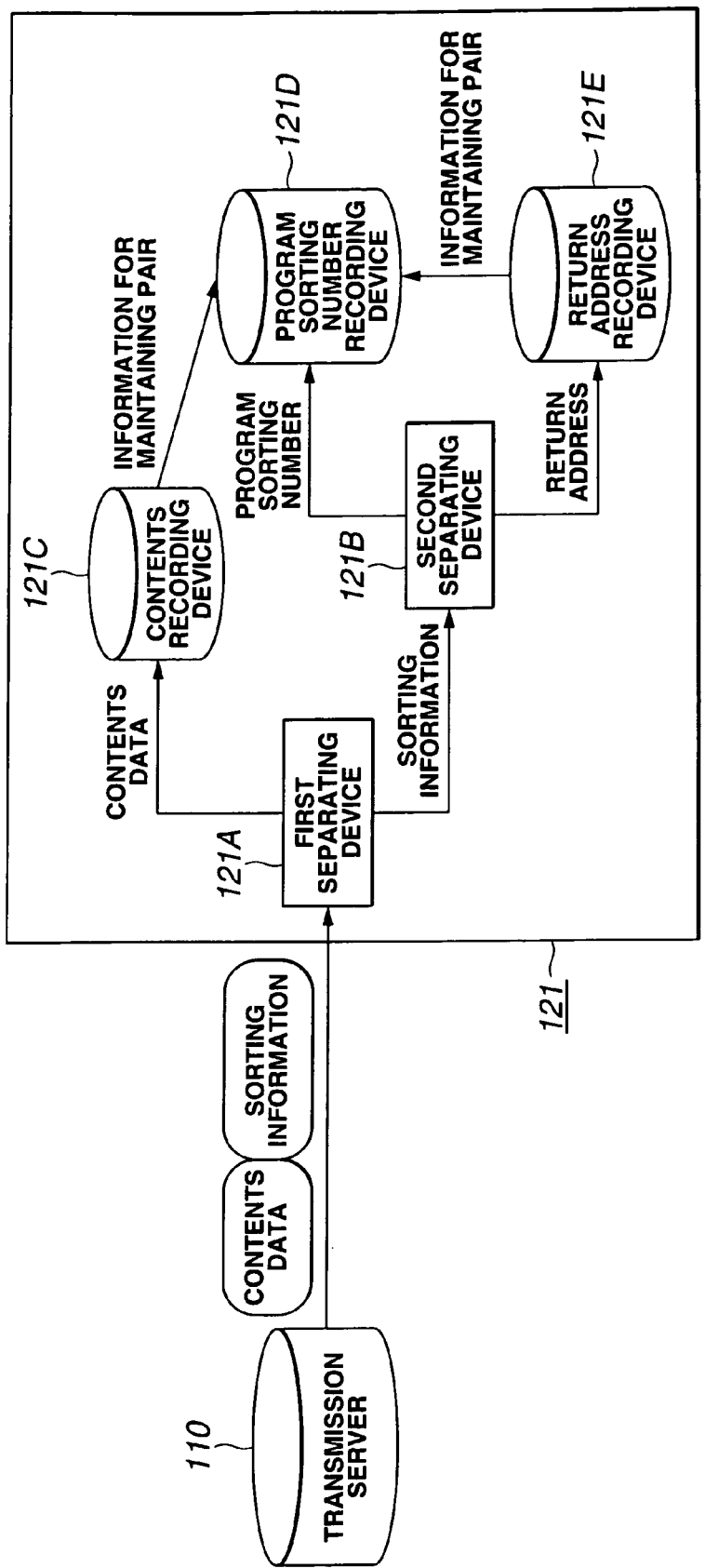
FIG. 7 is a schematic illustration of the operation of the recording/reproducing device of one of the information terminal of the embodiment of information providing system of FIG. 3 when receiving information.

Now, referring to FIG. 7, the recording/reproduction device 121 comprises a first separating device 121A that is adapted to separate the contents data (program main bodies+auxiliary materials) transmitted in a continuous stream from the transmission server 110 and the sorting information attached to them and a second separating device 121B that is adapted to isolate the program sorting members and the return addresses contained in the sorting information isolated by the first separating device 121A. Then, the recording/reproduction device 121 records the contents data (program main bodies+auxiliary materials), the program sorting numbers and the return addresses respectively on contents recording device 121C, program sorting number recording device 121D and return address recording device 121E thereof. The information necessary for maintaining the relationship of each of the contents data (program main body+auxiliary materials), its program sorting number and its return address is recorded on the program sorting number recording device 121 D and shared by the recording devices.

It may be so arranged that the return address is not transmitted each time and the recording/reproduction device 121 reads out the number of the channel in which it is tuned and so that the fixed return address allocated to the channel number may always be used when sending back information. Note, however, even in such a case, it is necessary to initially register a return address (as initial value) for the key to be used when requesting the return address that the channel number contains in it. For such registration, the transmission server may send a subset of pieces of sorting information (containing only return addresses) to be used for registration in a separate occasion.

Figure 8:
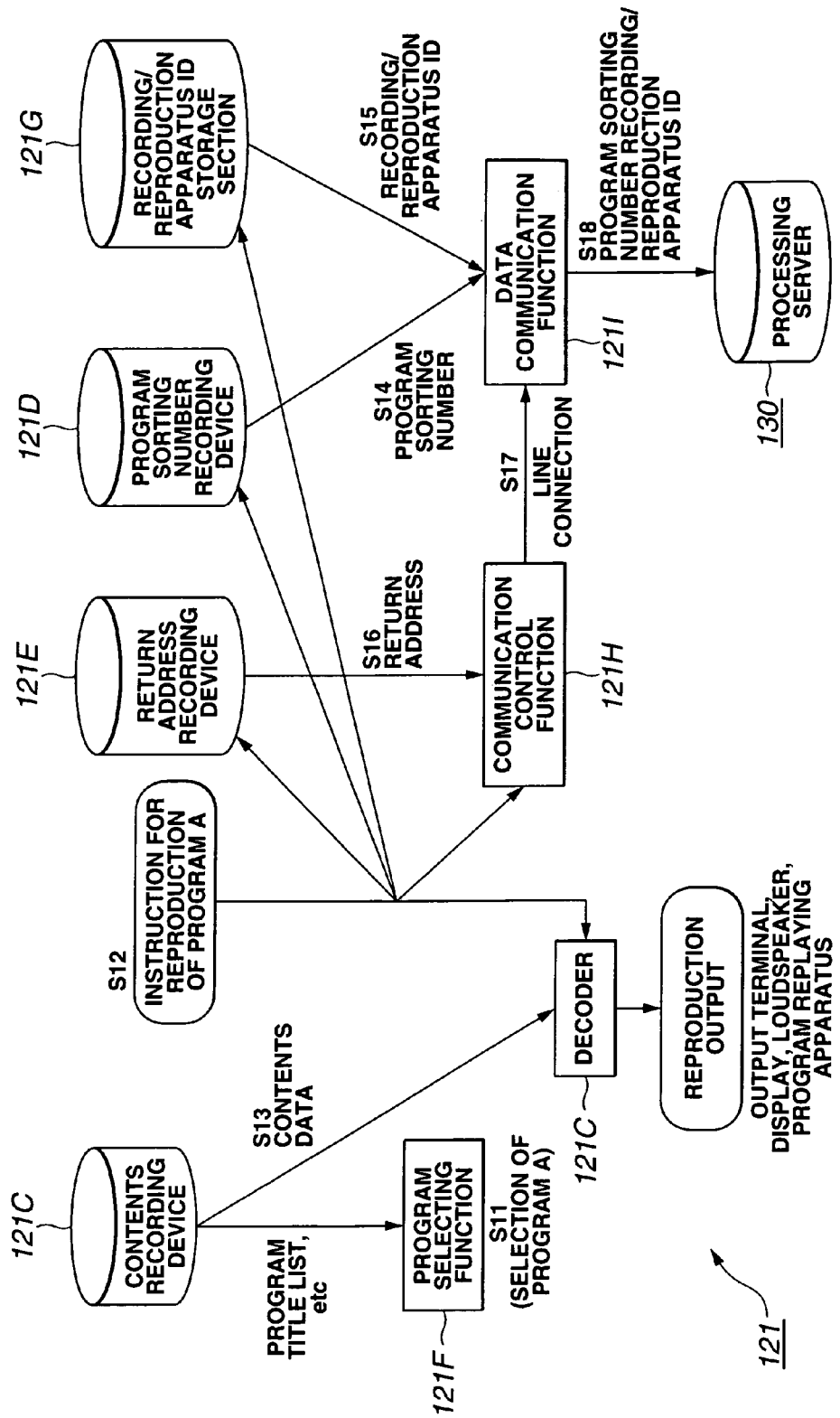
FIG. 8 is a schematic illustration of the operation of the recording/reproduction device of the information terminal of FIG. 7 when transmitting program sorting numbers.

Furthermore, as illustrated in FIG. 8, the recording/reproduction device 121 has a program selecting function 121F of selecting a desired contents data out of those stored in the contents recording device 121C. Thus, it selects the a contents data by means of its program selecting function 121F (S11) and, as a replay button (not shown) is depressed to start reproducing the contents data (S12), the contents data is read out from the contents recording device 121C and decoded by means of a decoder (S13) to reproduce the sounds/images, or the program, contained in said contents data.

Additionally, as a command is given to the recording/reproduction device 121 to reproduce the contents data, the contents data to be reproduced is read out from the contents data recording device 121C (S14) while, at the same time, the recording/reproduction device ID information of the recording/reproduction device 121 is also read out from the ID information storage section 121G (S15) and the return address is read out from the return address recording device 121F (S16) so that the line is connected to device having the return address by means of communication control function 121H of the recording/reproduction device 121 on the basis of the return address (S17) and the program sorting number read out from the program sorting number recording device 121D and the recording/reproduction device ID information read out from the ID information storage section 121G are transmitted to the device having the return address (S18). The recording/reproduction device ID information read out from the ID information storage section 121G are then transmitted to the processing server 130 byway of the network that may be Internet by means of data transmitting function 121I of the recording/reproduction device 121.

As shown in FIG. 3, the processing server 130 of the information providing system 100 comprises a revision assisting material confirmation processing device 131 for confirming the revision assisting materials on the basis of the sorting information and the recording/reproducing ID information received from the recording/reproducing device 121, a revision assisting material transmitting device 132 for transmitting revision assisting materials to the recording/reproduction device 121 according to the alteration command of the revision assisting material confirmation processing device 131 and an arithmetic processing device 133, which is optional.

Figure 9:
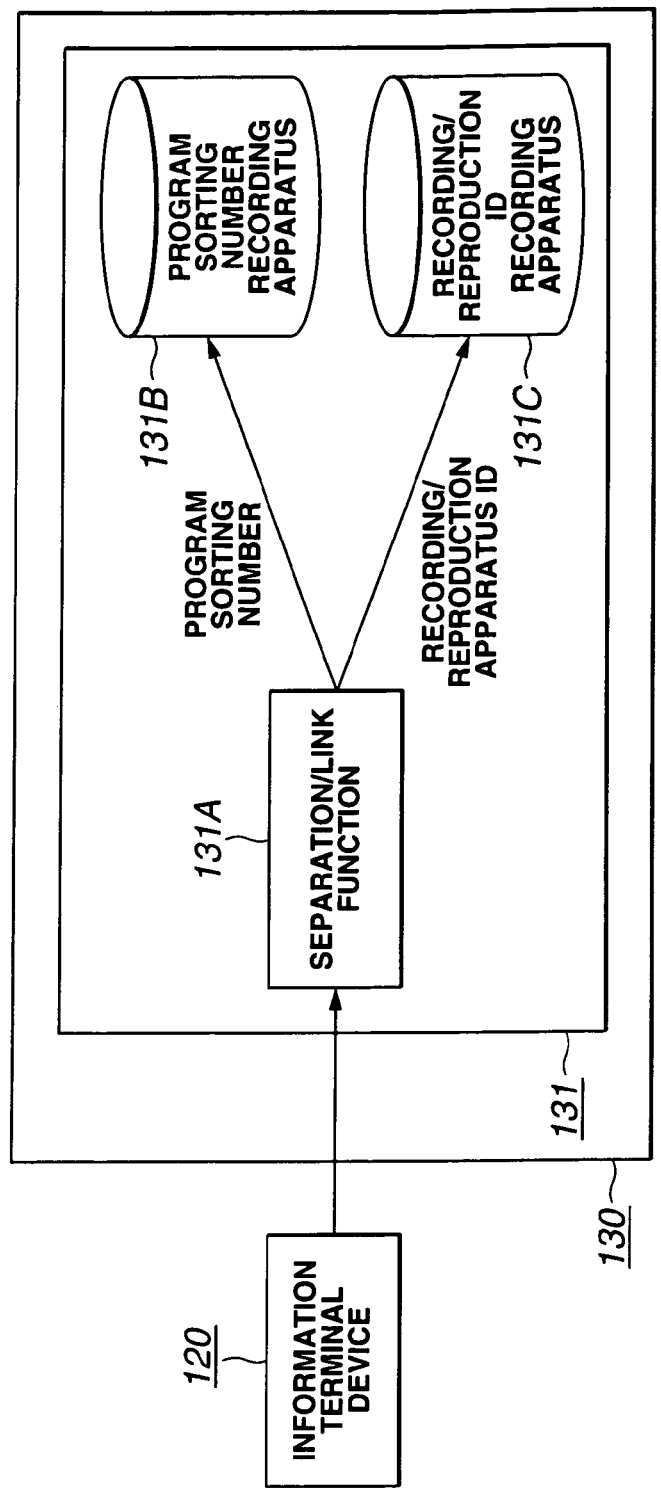
FIG. 9 is a schematic illustration of the operation of the processing server of the embodiment of information providing system of FIG. 3 when receiving program sorting numbers.

Now referring to FIG. 9, the revision assisting material confirmation processing device 131 receives the program sorting number and the recording/reproduction device ID information transmitted in return from the recording/reproduction device 121, separates the program sorting number and the recording/reproducing device ID information from each other by separation/link function 131A and record them respectively in program sorting number recording device 131B and recording/reproducing device ID information recording device 131C thereof in a coordinated manner in order to confirm the revision assisting materials on the basis of the program sorting number and the recording/reproduction device ID information. More specifically, the revision assisting material confirmation processing device 131 manages the profile data of the user/subscriber including the name, the sex, the profession and the hobbies of the user and the device profile data of the information terminal 120 of the user/subscriber including the address of the building where the recording/reproduction device 120 is installed, the position where the recording/reproduction device 120 is located and the current time and confirms the revision assisting materials on the basis of the program sorting number and the recording/reproduction device ID information.

The revision assisting material transmitting device 132 of the processing server 130 transmits the revision assisting materials to said recording/reproduction device 121 according to the alteration command of the revision assisting material confirmation processing device 131 and manages and notifies settlement functioning section 150 of the result of the alteration of the sequence of reproduction. Upon receiving the result of the alternation of the sequence of reproduction, the settlement functioning section 150 settles the accounts with the user/subscriber of the information terminal 120 and the program provider.

The optional arithmetic processing device 133 of the processing server 130 is adapted to perform operations of comparting the profile data managed by the revision assisting material confirmation processing device 131 and the attributes of the revision assisting materials transmitted from the revision assisting material transmitting device 132 and, if necessary, make a new arrangement for transmission so that it may notifies the recording/reproducing device 121 of the new sequence of reproduction of contents clips of the recording/reproduction device 121.

Figure 10:
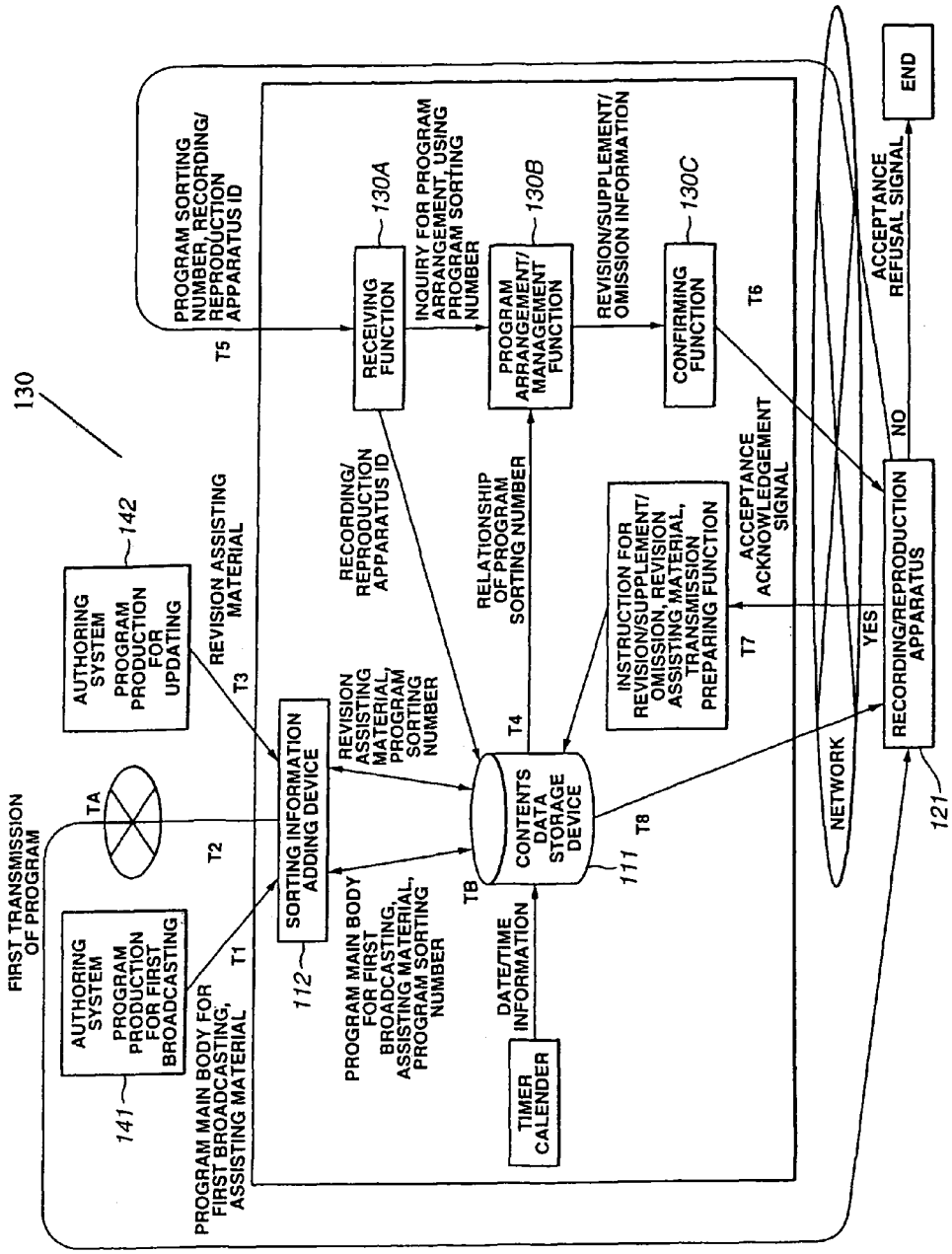
FIG. 10 is a schematic illustration of the operation of transmitting an instruction for changing auxiliary materials and revision assisting materials from the processing server to the recording/reproduction device by way of the network.

FIG. 10 shows the configuration of the processing server 130 that is adapted to transmit instructions for alterations to be made to the auxiliary materials and revision assisting materials to the recording/reproduction device 121 by way of the network.

In FIG. 10, T1, T2, TA and TB indicate the respective steps' of the sequence of management TB and transmission TA of the contents to be transmitted for the first time.

More specifically, as the contents data (program main bodies+auxiliary materials) to be transmitted for the first time are supplied from authoring system 141 that is responsible for the arrangement of the programs to be transmitted for the first time (T1), the sorting information adding device 112 allocates program sorting numbers to the respective contents data to be transmitted for the first time so that the contents data are stored with the program sorting numbers in the contents data storage device 111, which manages the contents data and the program sorting numbers it stores (TB). Meanwhile, the contents data to be transmitted for the first time to which program sorting numbers are allocated are transmitted as program to the related information terminals 120 by way of the network.

In FIG. 10, T3 and T4 indicates the respective steps of the sequence to be followed when the original program is revised, supplemented and/or partly omitted. More specifically, as revision assisting materials are supplied from the authoring system 142 that is responsible for revising, supplementing and/or partly omitting the original program (T3), the sorting information adding device 112 allocates program sorting numbers to the respective revision assisting materials so that the revision assisting materials are stored with the program sorting numbers in the contents data storage device 111, which manages the revision assisting materials and the processing sorting numbers it stores (T4). In other words, the information indicating the relationship of each of the old program sorting numbers and the corresponding new program number, if any, is provided.

Figure 11:
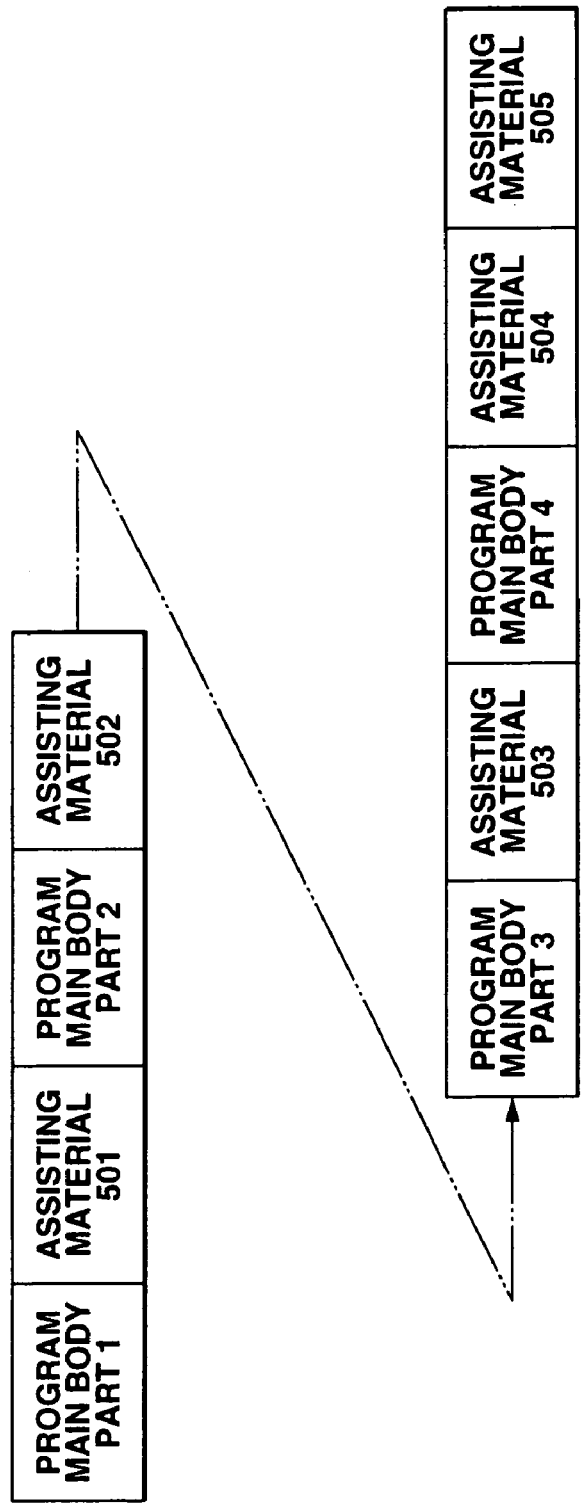
FIG. 11 is a schematic illustration of an example of arrangement of contents data to be transmitted initially from the authoring system adapted to produce programs to be transmitted for the first time in the embodiment of information providing system of FIG. 3.

Assume here that a program arrangement (program sorting number 12B9911032100) is made for the contents data (program main bodies+auxiliary materials) to be transmitted for the first time by the authoring system 141 responsible for the arrangement of the programs to be transmitted for the first time as shown in FIG. 11. The contents data of the program are then transmitted from the transmission server 110 by way of the network (TA) and recorded by the recording/reproduction device 121 of each of the related information terminals 120. At the same time, the contents data of the program are registered in the archive system of the processing server so that they may be updated subsequently (TB).

Assume also that the sorting number of the above program (program sorting number 12, B9911032100) is accompanied by a breakdown that is described as 12Bpart1, SM501, 12Bpart2, SM502, 12Bpart3, SM503, 12Bpart4, SM504, SM505, . . .

Figure 12:
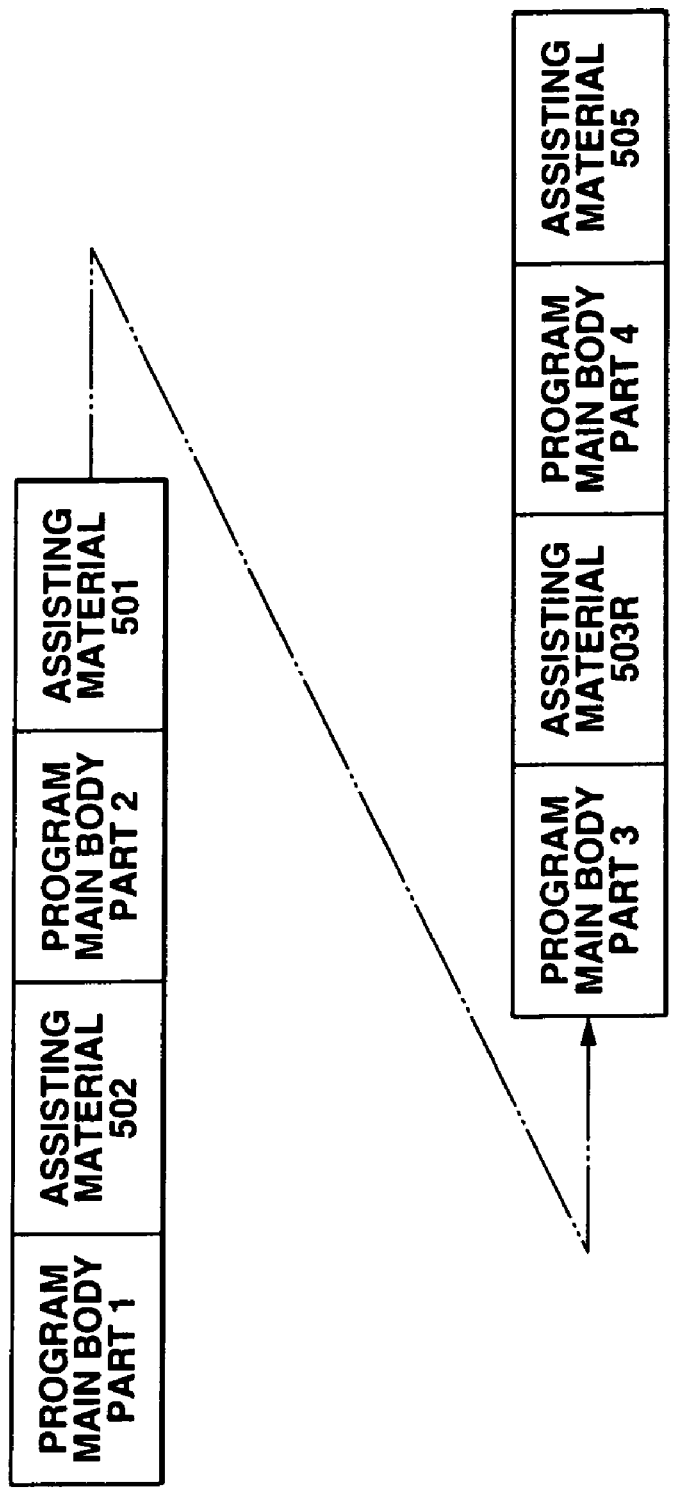
FIG. 12 is a schematic illustration of the proper program arrangement when the server receives an update in the embodiment of information providing system of FIG. 3.

Assume also that the program sorting number 12B9911032100 is recorded in the recording/reproduction device 121 of the information terminal 120 but the server has already received a request for updating and a revised program arrangement is made as shown in FIG. 12.

The revised arrangement includes:
1) positional shift (SM501 and SM502 are switched),
2) revision (SM503 is replaced by SM503R) and
3) omission (SM504 is omitted).

Then, the breakdown of the revised arrangement is described as 12Bpart1, SM502, 12Bpart2, SM501, 12Bpart3, SM503R, 12Bpart4, SM505, . . . . . The revised (new) program arrangement is provided with program sorting number of 12B9911032100RE.

Figure 13:
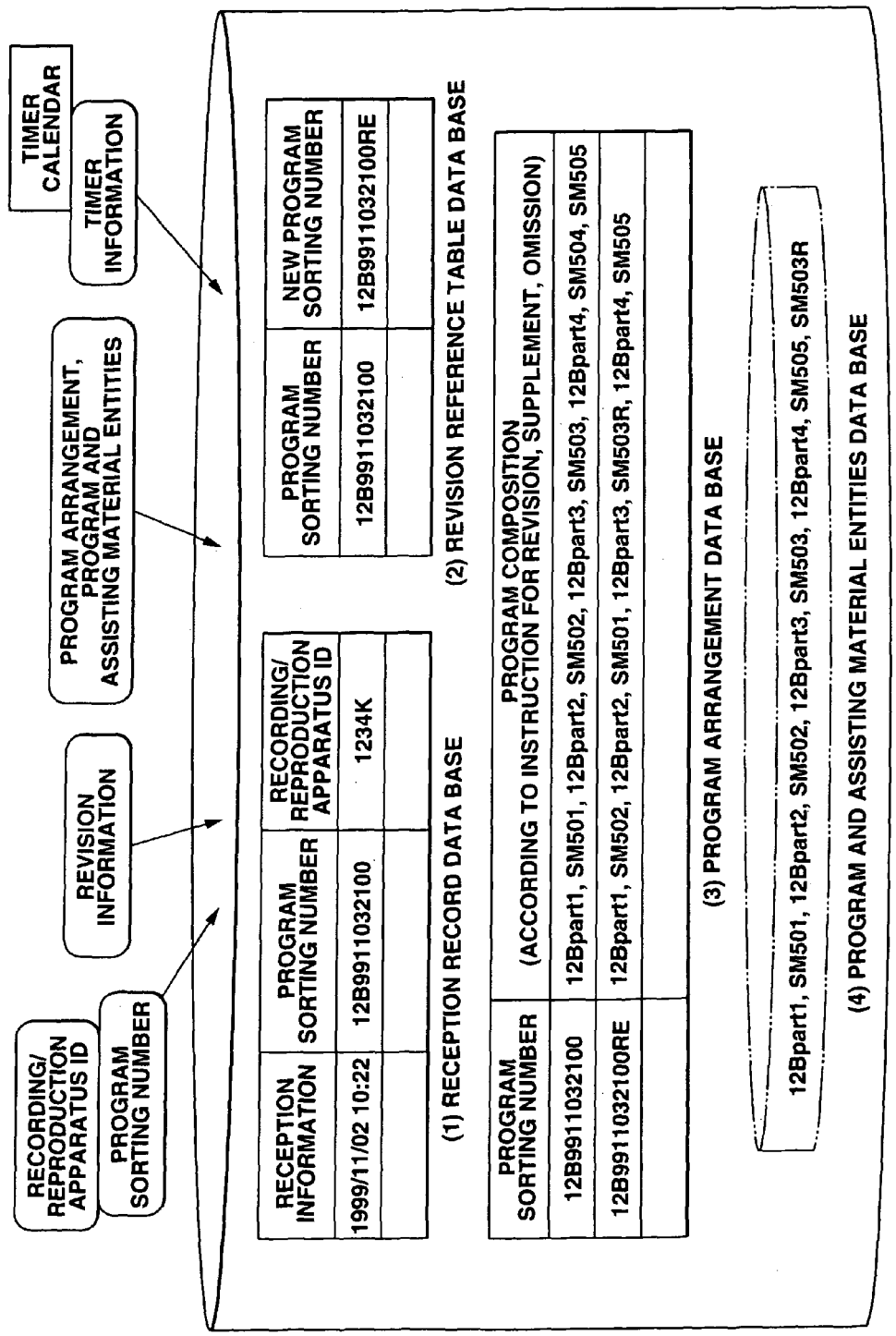
FIG. 13 is a schematic illustration of the contents of the data base of the contents data arranged in the transmission server of the embodiment of information providing system of FIG. 3.
Figure 14:
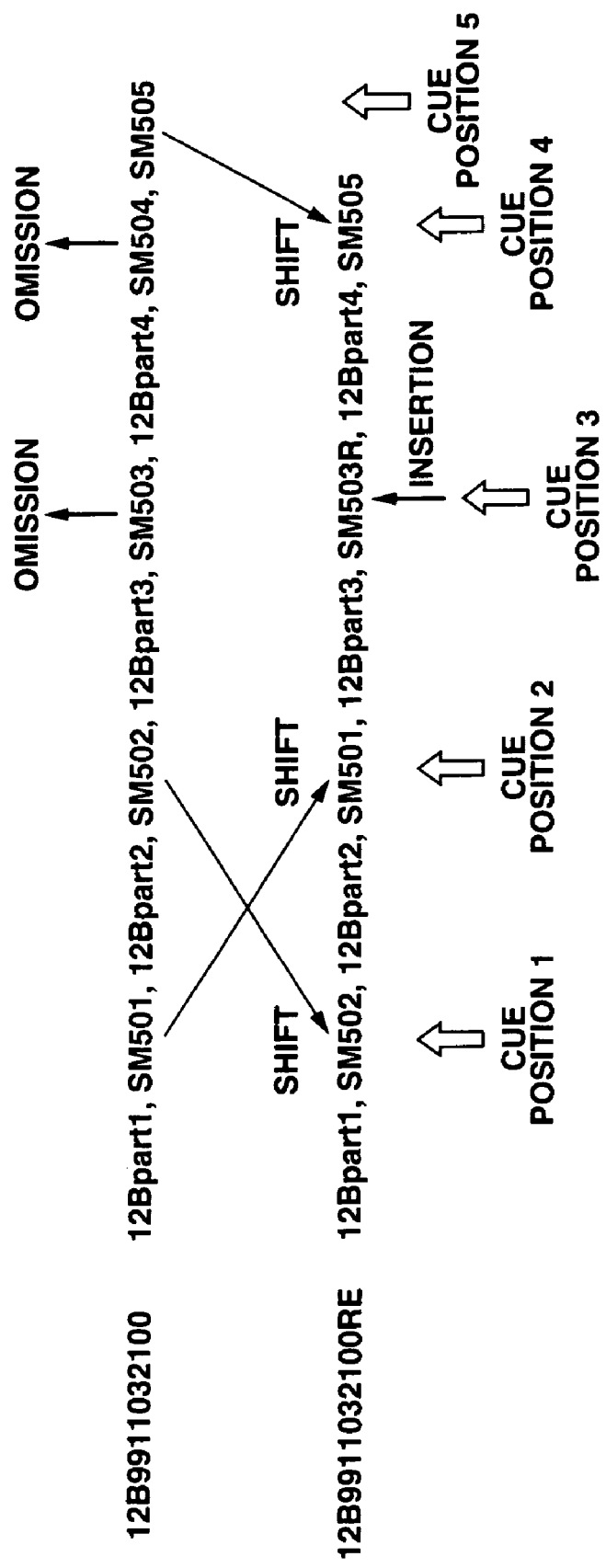
FIG. 14 is a schematic illustration of the changes made to the program arrangement corresponding to the revised program sorting numbers.

The contents data storage device 111 comprises (1) a reception record data base, (2) a revision reference table data base, (3) a program arrangement table data base and (4) a program main body/auxiliary material substance data bas as shown in FIG. 13.

Referring back to FIG. 10, the steps from T5 indicate the sequence to be followed when a program sorting number and recording/reproduction device ID information are transmitted from the information terminal 120 to the processing server by way of the network.

More specifically, upon receiving the program sorting number and the recording/reproduction device ID information from the information terminal 120 by means of its receiving function 130A, the processing server 130 separates the program sorting number and the recording/reproduction device ID information it receives from each other and writes the recording/reproduction device ID information in the contents data storage device 111. Then, it inquires of program arrangement/management device 130B about the program arrangement having the program sorting number transmitted from the recording/reproduction device 121 that is identified by the recording/reproducing device ID information.

The program arrangement/management device 130B is adapted to manage the revised and update arrangement on the basis of the information showing the relationship between each old program sorting number and the corresponding new program sorting number obtained from the contents data storage device 111. If an arrangement is revised, it allocates a new program sorting number to the arrangement and sends it to confirming function 130C.

The confirming function 130C obtains information on the replacements, the additions and/or omissions made to the old arrangement from the new program sorting number sent from the program arrangement/management device 130 and notifies the recording/reproduction device of the revisions, additions and/or omissions in order to make it ready for receiving the revision assisting materials necessary for the replacements and the additions and then confirms the reception of the revisions, supplements and/or omissions (T6).

The program arrangement/management device 130B can detect, if any, the revisions to be made on the program that the recording/reproduction device 121 of the information terminal 120 is going to reproduce by referring to (2) the revision reference table data base. If it detects any revisions to be made, it confirms the old program and the revised program by referring to (3) the program arrangement table data base and finds the difference. Then, it prepares "instructions for auxiliary materials to be added, for switching and for omissions", according to which the operations of shifting SM501 and SM502, omitting SM503, inserting SM503R, omitting SM504 and shifting SM505 are carried out at respective CUE positions 1 through 5.

FIG. 15 shows "the instructions for revisions, additions and/or omissions" transmitted from the confirming function 130C to the recording/reproduction device 121 of the information terminal 120 in step (T6) of FIG. 10 in this example.

If a response of YES, or an acknowledgment signal, is sent back from the recording/reproduction device 121, an operation of preparing for the transmission of the instructions for revisions, additions and/or omissions and the related revision assisting materials is carried out (T7) and the revision assisting materials are read out from the contents data storage device 111 and transmitted to the recording/reproduction device 121 by way of the network (T8).

The recording/reproduction device 121 of the information terminal 120 has the right of refusing the instructions for revisions, additions and/or omissions and, if an answer of NO, or a refusal signal, sent back from the recording/reproduction device 121, the processing operation is terminated there.

Figure 16:
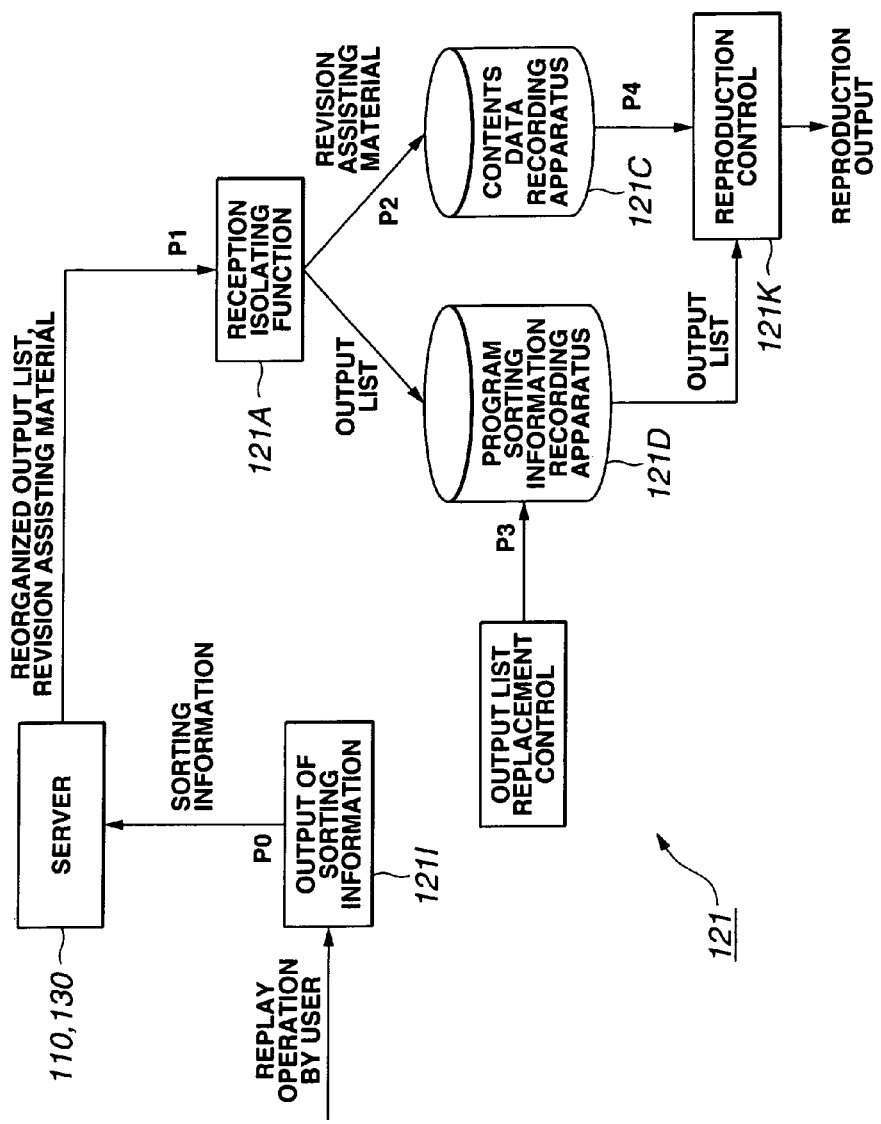
FIG. 16 is a schematic illustration of the arrangement for receiving an instruction for "revisions/additions/omissions" along with revision assisting materials at the recording/reproduction device.

The recording/reproducing device 121 receives the instructions for revisions, additions and/or omissions and the revision assisting materials by following the steps as shown in FIG. 16.

Firstly, as the recording/reproduction device 121 responds to the user operation by sending the program sorting number and the recording/reproduction device ID information to the processing server 130 by means of its data communication function 121 I (P0), the instructions for revisions, additions and/or omissions and the revision assisting materials are transmitted from the processing server 130 (P1). Then, it separates the instructions for revisions, additions and/or omissions and the revision assisting materials by means of its first separating function 121A so that the revision assisting materials are recorded in the contents data recording device 121C (P2) while the instructions for revisions, additions and/or omissions are recorded in the program sorting number recording device 121D to rewrite the transmission list so as to make it correctly reflect the program arrangement (P3). Then, the recording/reproduction device 121 reads out and reproduces the right contents data from the contents data recording device 121C according to the rewritten transmission list by means of its program reproduction control means 121K (P4).

Thus, the information providing system 100 having the above described configuration can easily replace and/or omit any of the auxiliary materials such as CMs by cooperating with the processing server 130 and the recording/reproducing device 121 ofthe information terminal 120.

In other words, the processing server 130 can find out any missing auxiliary materials and/or excessive materials in the recording/reproducing device on the basis of the program sorting number it receives. Then, the processing server 130 can prepare instructions for revising or omitting any of the auxiliary materials of the related recording/reproduction device and adding new auxiliary materials and send the missing auxiliary materials to it. As the processing server 130 can send necessary new auxiliary materials and complete the operation of replacing the corresponding old one with the newly sent auxiliary materials, it is possible for the information providing system 100 to provide a wide spectrum of services. For example, it can provide CMs for umbrellas with the weather forecast for tomorrow, CMs of a supermarket where the items for special discount sale change every day and it is also possible to replace any obsolete Cms, reflecting the timer calendar to the applicable profile. Additionally, it is possible to replace a nation wide CM edition with a corresponding local CM edition, reflecting the local information of the local area where the user/subscriber lives to the applicable profile. Still additionally, it is possible to replace the CMs in such a way that CMs for high priced commodities may be provided to the user/subscriber, reflecting the income information to the applicable profile. Beside, it is possible to provide a cherry blossom watching travel program that is produced by timely replacing the destination area on the basis of the forecast for the cherry blossom front, reflecting the timer calendar to the applicable profile. For example, the destination of the scheduled cherry blossom watching travel shown in a cherry blossom watching travel program may be Kyusyu in March but may be replaced by Tohoku in April, although the telephone number of the receptionist of the travel agent and the starting point of the travels may be same and commonly used both in the original program and in the replacement. Additionally, some of the CMs may be replaced by those of local travel guide, reflecting the destination of the schedule cherry blossom watching travel to the applicable profile. If some of the hobbies of the user/subscriber that are input and recorded are related to the destination of the scheduled travel, the attributes of the CMs may be made to match the hobbies. As another example, in a program for teaching the procedure of submitting the tax return of the year, the contents may be partly replaced and rearranged appropriately to reflect the sources and the amount of income of the user/subscriber to the applicable profile so that the user/subscriber may be able to watch a program that matches the amount and the profile of annual income that may vary depending on if he or she earns money from real estate or not, if he of she received a retirement grant or not and so on. As still another example, in a program for instructing the shop regulations of a company, the parts that vary depending on the position in the company may be replaced for each viewer/employee, while the parts that are common to all the employees may remain unchanged. Then, the ordinary employees and the employees ofthe management level maybe made to watch different respective programs. As still another example, in a stock market program, the contents clips may be so arranged that every user/inventor may watch the information on the stocks he or she has (auxiliary materials) first, reflecting the stocks to the applicable profile. As still another example, in a sports information program, the information on the favorite team may be reflected to the applicable profile so that the information on the team (auxiliary materials) may take a major part in the program. As still another example, the date of birth of a child may be stored and reflected to the applicable profile so that an education program may be made to contain teaching materials adapted to children ofthe age. As still another example, the favorite programs of a child may be automatically analysed and the result of the analysis may be reflected to a BGM program so that the program may contain tunes of the favorite genre of the child to a large extent. As a further example, the favorite air lines of a person may be automatically analyses and the result of the analysis may be reflected to a travel information program that shows candidate timetables for an itinerary where the flight services of the air lines has the top priority and shown first. Furthermore, in the information providing system 50, it may be so arranged the data to be put into the applicable profile are automatically updated or automatically analyzed to make the profile a highly dynamic one.

It is not necessary for each program or auxiliary material to contain the attribute information so long as the processing server has the attribute information of each processing and each auxiliary material because any attribute can be detected by using the related program sorting number. If necessary, any attribute may be delivered to the recording/reproduction device when it is required and it is also possible to change all the attributes available to the recording/reproduction device altogether by rewriting the attributes according to the instructions issued by the processing server.

Of the information providing system 100, the processing server 130 may be provided with the user profile of each user and the attributes of the contents for the purpose of reducing the cost of the recording/reproduction device and making it possible to easily upgrade the recording/reproduction device. Additionally, the processing server 130 can perform various arithmetic operations relating to the contents reproduced by the information terminal 120 on the basis of the sorting information and the terminal ID information transmitted from the information terminal 120 so that it may be able to determine the viewing rate of the contents. Still additionally, the processing server 130 can confirm the copied status of the contents reproduced by the information terminal 120 also on the basis of the sorting information and the terminal ID information transmitted from the information terminal 120.

When the recording/reproduction device 121 of the information terminal 120 is operated for reproducing a program, the program sorting number and the recording/reproduction device ID information are delivered to the processing server 130 in the above description of the information providing system 100, it may be so arranged that the processing server 130 receives the program sorting number and the recording/reproduction device ID 1) when the recording/reproduction device is operated for replay,
2) when the recording/reproducing device is powered,
3) implicitly when some other recording/reproduction device is operated,
4) regularly on the basis of the readings of the timer,
5) when the recording/reproduction device is called by the processing server and
6) when the recording/reproduction device is operated explicitly by the user, The sorting number of one of the plurality of programs recorded in the recording/reproduction device is transmitted in any of the following occasions.

A) There is only a program whose program sorting number is to be transmitted to the processing server and the program is clearly identified as in the case of 1) above.

B) There are a plurality of programs whose program sorting numbers are to be transmitted to the processing server and the programs are explicitly identified as in the case of 6) above.

C) The program sorting numbers of all the programs recorded in the recording/reproduction device are to be transmitted as in the case of 2) above.

Any of the six occasions where the processing server receives the program sorting number and the recording/reproduction device ID information and any of the three occasion where the program sorting number of a program is selectively transmitted may be combined.

What is claimed is:

1. An information providing system comprising:
    a transmission server configured to transmit a continuous stream of contents data of a group of multimedia contents including prearranged combinations of program main body data, groups of auxiliary materials, and sorting information attached to the program main body data and groups of auxiliary materials, wherein the sorting information includes sorting numbers and a return address corresponding to a processing server that is different from the transmission server;
    a terminal configured to receive the continuous stream of contents data transmitted from said transmission server;
    a memory at the terminal configured to store information related to profile data of a user and profile data of the terminal; and
    a reproducing section at the terminal configured to reproduce the contents data by modifying an arrangement order of the contents data by comparing attribute data of each program main body data and that of each auxiliary material of a program as separated from each other with the information related to profile data of the user and the profile data of the terminal, wherein
    the terminal is configured to transmit sorting numbers corresponding to the modified arrangement order of the contents to the processing server based on the sorting numbers and the return address included in the sorting information attached to the program main body and the groups of auxiliary materials.

2. The information providing system according to claim 1, wherein said terminal comprises:
    an on demand control function configured to request additional contents data on an on demand basis and receive said additional contents data on the basis of the result obtained by comparing said attribute data and said profile data.

3. The information providing system according to claim 1, wherein
    said processing server comprises a management function configured to settle accounts on the basis of the modified arrangement order notified from said terminal.

4. The information providing system according to claim 1, wherein the terminal is configured to be connected to a removable recording medium that includes profile data of another user, and the reproducing section is configured to replace the information related to profile data of the user with information related to the profile data of the another user when the removable recording medium is connected to the terminal.

5. The information providing system according to claim 4, wherein the reproduction section is configured to modify the arrangement order of the contents data by comparing attribute data of each program main body data and that of each auxiliary material of the program as separated from each other with the information related to the profile data of the another user and the profile data of the terminal.

6. The information providing system according to claim 1, further comprising:
    a first separating device at the terminal section configured to separate the continuous stream of contents data received from the transmission server into first information including the program main body data and the groups of auxiliary materials and second information including the sorting information.

7. The information providing system according to claim 1, further comprising:
    a second separating device at the terminal section configured to isolate the sorting members and the return addresses included in the second information output from the first separating device.

8. An information terminal comprising:
    an interface configured to receive, from a transmission server, a continuous stream of contents data of a group of multimedia contents including prearranged combinations of program main body data, groups of auxiliary materials, and sorting information attached to the program main body data and groups of auxiliary materials, wherein the sorting information includes sorting numbers and a return address corresponding to a processing server that is different from the transmission server
    a memory configured to store information related to profile data of a user and profile data of the information terminal; and
    a reproduction section configured to reproduce the contents data by modifying an arrangement order of the contents data by comparing attribute data of each program main body data and that of each auxiliary material of a program as separated from each other with the information related to profile data of the user and the profile data of the information terminal, wherein
    the interface is configured to transmit sorting numbers corresponding to the modified arrangement order of the contents to the processing server based on the sorting numbers and the return address included in the sorting information attached to the program main body and the groups of auxiliary materials.

9. The information terminal according to claim 8, further comprising:
an on demand control function configured to request additional contents data on an on demand basis and receive said additional contents data on the basis of the result obtained by comparing said attribute data and said profile data.

10. The information terminal according to claim 8, wherein the information terminal is configured to be connected to a removable recording medium that includes profile data of another user, and the reproduction section is configured to replace the information related to profile data of the user with information related to the profile data of the another user when the removable recording medium is connected to the information terminal.

11. The information terminal according to claim 10, wherein the reproduction section is configured to modify the arrangement order of the contents data by comparing attribute data of each program main body data and that of each auxiliary material of the program as separated from each other with the information related to the profile data of the another user and the profile data of the information terminal.

12. An information providing method comprising:
transmitting, from a transmission server, a continuous stream of contents data of a group of multimedia contents including prearranged combinations of program main body data, groups of auxiliary materials, and sorting information attached to the program main body data and groups of auxiliary materials, wherein the sorting information includes sorting numbers and a return address corresponding to a processing server that is different from the transmission server;
storing, at a memory of the information terminal, information related to profile data of the user and profile data of the information terminal;
receiving the continuous stream of contents data at the information terminal and reproducing the contents data by modifying an arrangement order of the contents data by comparing attribute data of each program main body data and that of each auxiliary material of a program as separated from each other with the information related to profile data of the user and the profile data of the information terminal; and
sending, from the information terminal, sorting numbers corresponding to the modified arrangement order of the contents to the processing server based on the sorting numbers and the return address included in the sorting information attached to the program main body and the groups of auxiliary materials.

13. The information providing method according to claim 12, further comprising:
providing additional contents data on an on demand basis in response to a request for the additional contents data made on the basis of the result obtained by comparing said attribute data and said profile data.

14. The information providing method according to claim 12, further comprising:
settling an account on the basis of the result of reproducing the contents data.

15. The information providing method according to claim 12, further comprising:
replacing the information related to profile data of the user with information related to profile data of another user when a removable recording medium that includes profile data of another user is connected to the information terminal.

16. The information providing method according to claim 15, wherein the arrangement order of the contents data is modified by comparing attribute data of each program main body data and that of each auxiliary material of the program as separated from each other with the information related to the profile data of the another user and the profile data of the information terminal.

* * * * *